(12) United States Patent
Bertz et al.

(10) Patent No.: US 8,649,355 B1
(45) Date of Patent: Feb. 11, 2014

(54) SUPPORTING SIMPLE IP WITH ADDRESS TRANSLATION IN A WIRELESS COMMUNICATION DEVICE

(75) Inventors: Lyle T. Bertz, Lee's Summit, MO (US); John E. Belser, Olathe, KS (US)

(73) Assignee: Sprint Spectrum L.P., Overland Park, KS (US)

(*) Notice: Subject to any disclaimer, the term of this patent is extended or adjusted under 35 U.S.C. 154(b) by 311 days.

(21) Appl. No.: 12/873,993

(22) Filed: Sep. 1, 2010

(51) Int. Cl.
*H04W 4/00* (2009.01)
*H04L 12/66* (2006.01)

(52) U.S. Cl.
USPC ............ 370/331; 370/328; 370/329; 370/338; 370/352

(58) Field of Classification Search
None
See application file for complete search history.

(56) References Cited

U.S. PATENT DOCUMENTS

| | | | |
|---|---|---|---|
| 6,055,236 A | 4/2000 | Nessett et al. | |
| 6,353,614 B1 | 3/2002 | Borella et al. | |
| 6,353,891 B1 | 3/2002 | Borella et al. | |
| 6,496,867 B1 | 12/2002 | Beser et al. | |
| 6,523,068 B1 | 2/2003 | Beser et al. | |
| 6,567,405 B1 | 5/2003 | Borella et al. | |
| 6,697,354 B1 | 2/2004 | Borella et al. | |
| 6,708,219 B1 | 3/2004 | Borella et al. | |
| 6,731,642 B1 | 5/2004 | Borella et al. | |
| 6,781,982 B1 | 8/2004 | Borella et al. | |
| 6,822,957 B1 | 11/2004 | Schuster et al. | |
| 6,978,128 B1 | 12/2005 | Raman et al. | |
| 6,996,621 B1 | 2/2006 | Borella et al. | |
| 7,031,275 B1 | 4/2006 | Borella et al. | |
| 7,032,242 B1 | 4/2006 | Grabelsky et al. | |
| 7,113,782 B2 | 9/2006 | Lucidarme | |
| 7,171,492 B1 | 1/2007 | Borella et al. | |
| 7,218,618 B2 | 5/2007 | Greis et al. | |
| 7,286,512 B1 | 10/2007 | Borella | |
| 7,289,504 B1 | 10/2007 | Hippelainen et al. | |
| 7,573,873 B1 | 8/2009 | Borella et al. | |
| 2004/0102195 A1 | 5/2004 | Naghian et al. | |
| 2004/0221042 A1 | 11/2004 | Meier | |
| 2005/0083969 A1 | 4/2005 | Lee et al. | |
| 2006/0288092 A1 | 12/2006 | Subramaniam | |
| 2007/0081512 A1 | 4/2007 | Takeda et al. | |
| 2007/0189219 A1 | 8/2007 | Navali et al. | |
| 2007/0195800 A1 | 8/2007 | Yang et al. | |
| 2007/0232307 A1 | 10/2007 | Ibrahim et al. | |
| 2007/0253371 A1 | 11/2007 | Harper et al. | |
| 2007/0297377 A1 | 12/2007 | McCann et al. | |
| 2008/0080427 A1 | 4/2008 | Suh et al. | |
| 2008/0095118 A1 | 4/2008 | Cakulev et al. | |

(Continued)

OTHER PUBLICATIONS

D. Wing, "PCP Design Considerations," PCP Working Group, Internet-Draft, Sep. 17, 2010.

(Continued)

*Primary Examiner* — Faruk Hamza
*Assistant Examiner* — Diane Lo

(57) ABSTRACT

Methods and devices for supporting simple Internet Protocol (IP) with address translation in a wireless communication device (WCD) are presented. The WCD may contain a translation module and an application module. The application module may be assigned a local IP address to which the application module binds. However, the translation module may attempt to hide the application module's use of this local address. Thus, the translation module may translate the source address of packets sent by the application module from the local IP address to a different IP address that has been assigned to the WCD by a Proxy Mobile IP (PMIP) gateway.

17 Claims, 16 Drawing Sheets

(56) References Cited

U.S. PATENT DOCUMENTS

| | | | |
|---|---|---|---|
| 2008/0205342 A1 | 8/2008 | Radhakrishnan et al. | |
| 2009/0016364 A1 | 1/2009 | Krishnan | |
| 2009/0197597 A1* | 8/2009 | Kotecha | 455/433 |
| 2009/0201852 A1 | 8/2009 | Chen | |
| 2009/0245149 A1 | 10/2009 | Xia et al. | |
| 2009/0257400 A1 | 10/2009 | Perras | |
| 2010/0017528 A1 | 1/2010 | Awano | |
| 2010/0027509 A1 | 2/2010 | Velev et al. | |
| 2010/0040020 A1 | 2/2010 | Chen | |
| 2010/0121944 A1 | 5/2010 | Huang et al. | |
| 2010/0226350 A1* | 9/2010 | Lim et al. | 370/338 |
| 2010/0246509 A1 | 9/2010 | Chen | |
| 2010/0278070 A1 | 11/2010 | Melia et al. | |
| 2011/0019660 A1* | 1/2011 | Kumarasamy et al. | 370/352 |
| 2011/0038377 A1 | 2/2011 | Haddad | |
| 2011/0047256 A1 | 2/2011 | Babu et al. | |
| 2011/0075675 A1 | 3/2011 | Koodli et al. | |
| 2011/0165892 A1 | 7/2011 | Ristich et al. | |
| 2011/0211553 A1 | 9/2011 | Haddad | |
| 2011/0216743 A1 | 9/2011 | Bachmann et al. | |
| 2011/0249636 A1 | 10/2011 | Cherian et al. | |
| 2012/0083262 A1 | 4/2012 | Dimou et al. | |
| 2012/0188884 A1 | 7/2012 | Simonsson et al. | |

OTHER PUBLICATIONS

M. Boucadair, Ed., et al., "IPv4 Connectivity Access in the Context of IPv4 Address Exhaustion: Port Range Based IP Architecture," Network Working Group, Internet-Draft, Jul. 3, 2009.

J. Sutter, "We're running out of internet addresses," http://edition.cnn.com/2010/TECH/innovation/07/23/internet.addresses/?hpt=Sbin, printed from the World Wide Web, CNN, Jul. 23, 2010.

GoMo News, "Mobile devices, IPv4 and the death of the Internet," http://www.gomonews.com/mobile-devices-ipv4-and-the-death-of-the-internet/, printed from the World Wide Web, published Jul. 26, 2010.

The Week, "The looming IP-address shortage: A Crisis for the internet age," http://theweek.com/article/index/205397/the-looming-ip-address-shortage-a-crisis-for-the-i . . . , printed from the World Wide Web, posted Jul. 27, 2010.

Office Action for U.S. Appl. No. 12/873,986 mailed Jul. 17, 2012, 32 pages.

K. Leung, et al., "WiMAX Forum / 3GPP2 Proxy Mobile IPv4," Independent Submission, Request for Comments: 5563, Feb. 2010.

S. Gundavelli, et al., "Proxy Mobile IPv6," Network Working Group, Request for Comments: 5213, Aug. 2008.

P. Srisuresh, et al., "IP Network Address Translator (NAT) Terminology and considerations," Network Working Group, Request for Comments: 2663, Aug. 1999.

C. Perkins, "IP Mobility Support for IPv4," Network Working Group, Request for Comments: 3344, Aug. 2002.

WiMAX Forum, WiMAX End-to-End Network Systems Architecture (State 3: Detailed Protocols and Procedures), Release 1, V&V Draft, Aug. 8, 2006.

Boucadair et al., "Anticipate IPv4 Address Exhaustion, A Critical Challenge for Internet Survival", 2009 First International Conference on Evolving Internet, 2009 IEEE, 27-32.

Office Action for U.S. Appl. No. 12/873,986 mailed Nov. 21, 2012, 26 pages.

Final Office Action for U.S. Appl. No. 12/873,986 mailed Mar. 26, 2013, 17 pages.

* cited by examiner

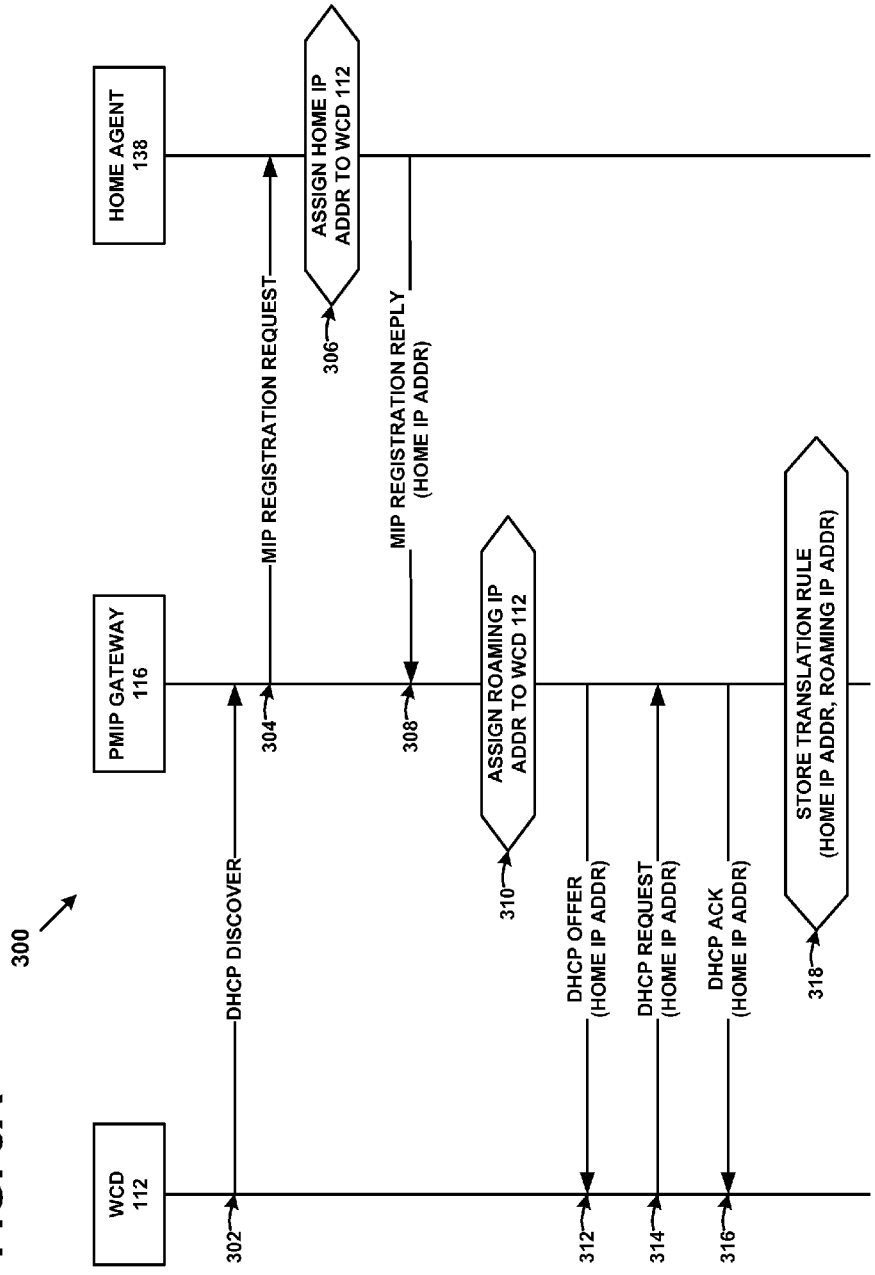

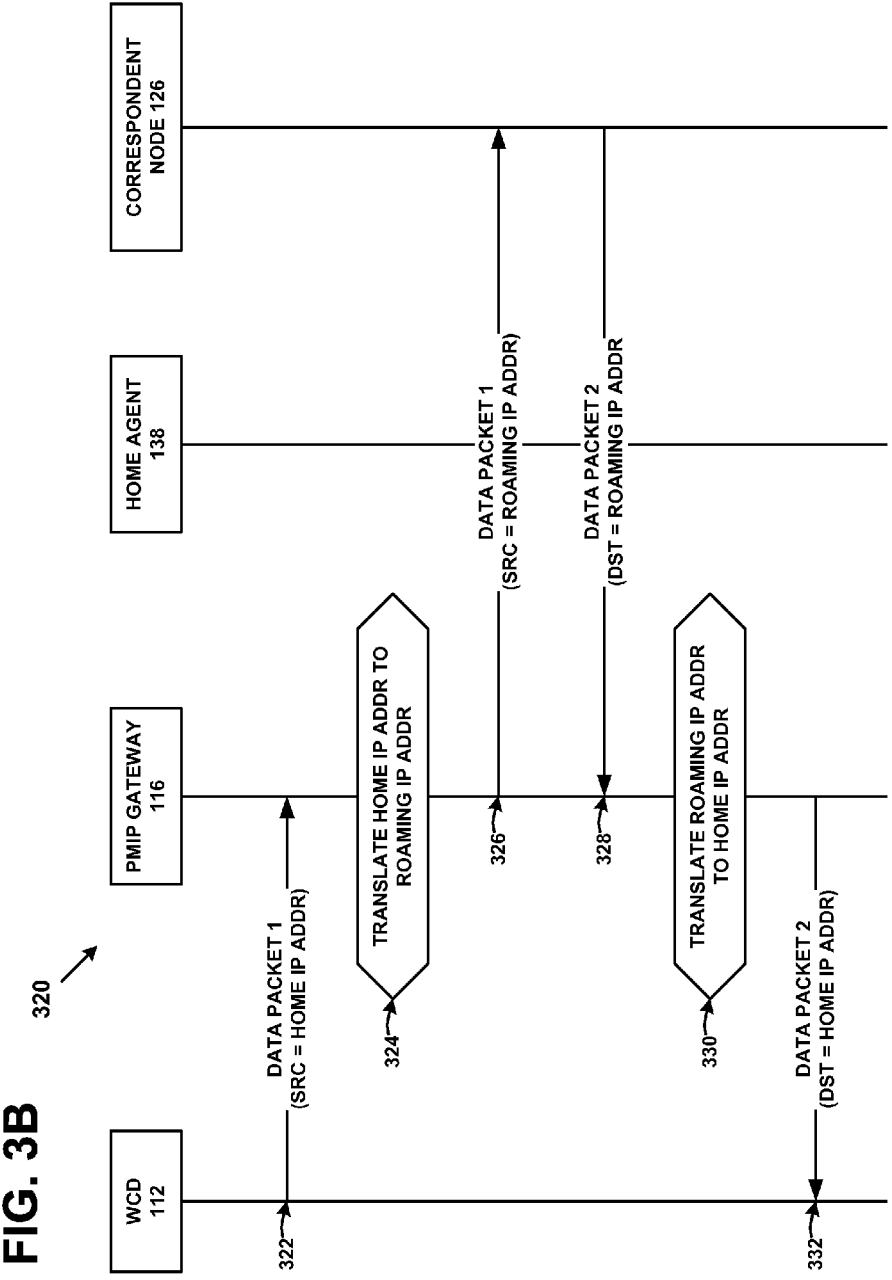

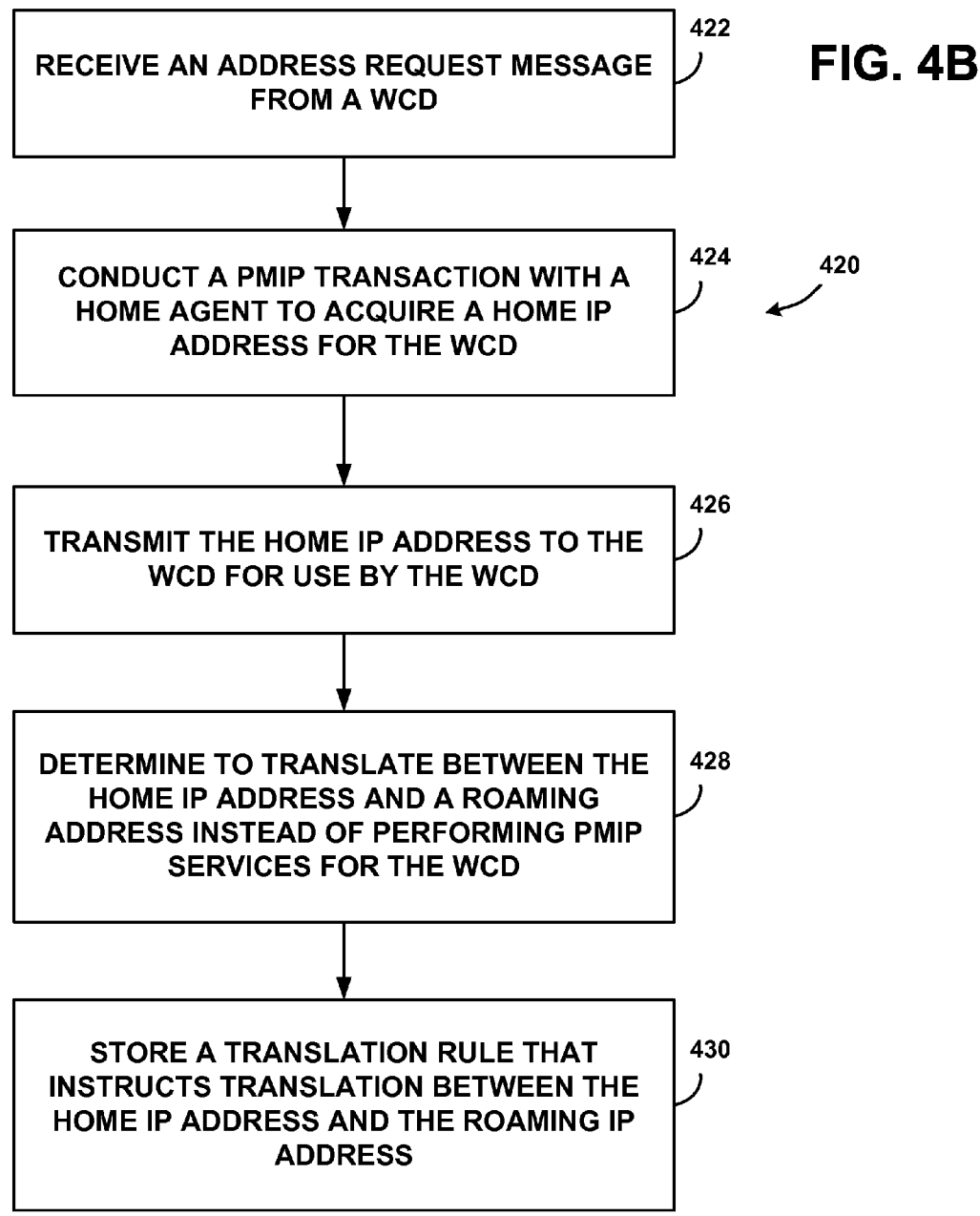

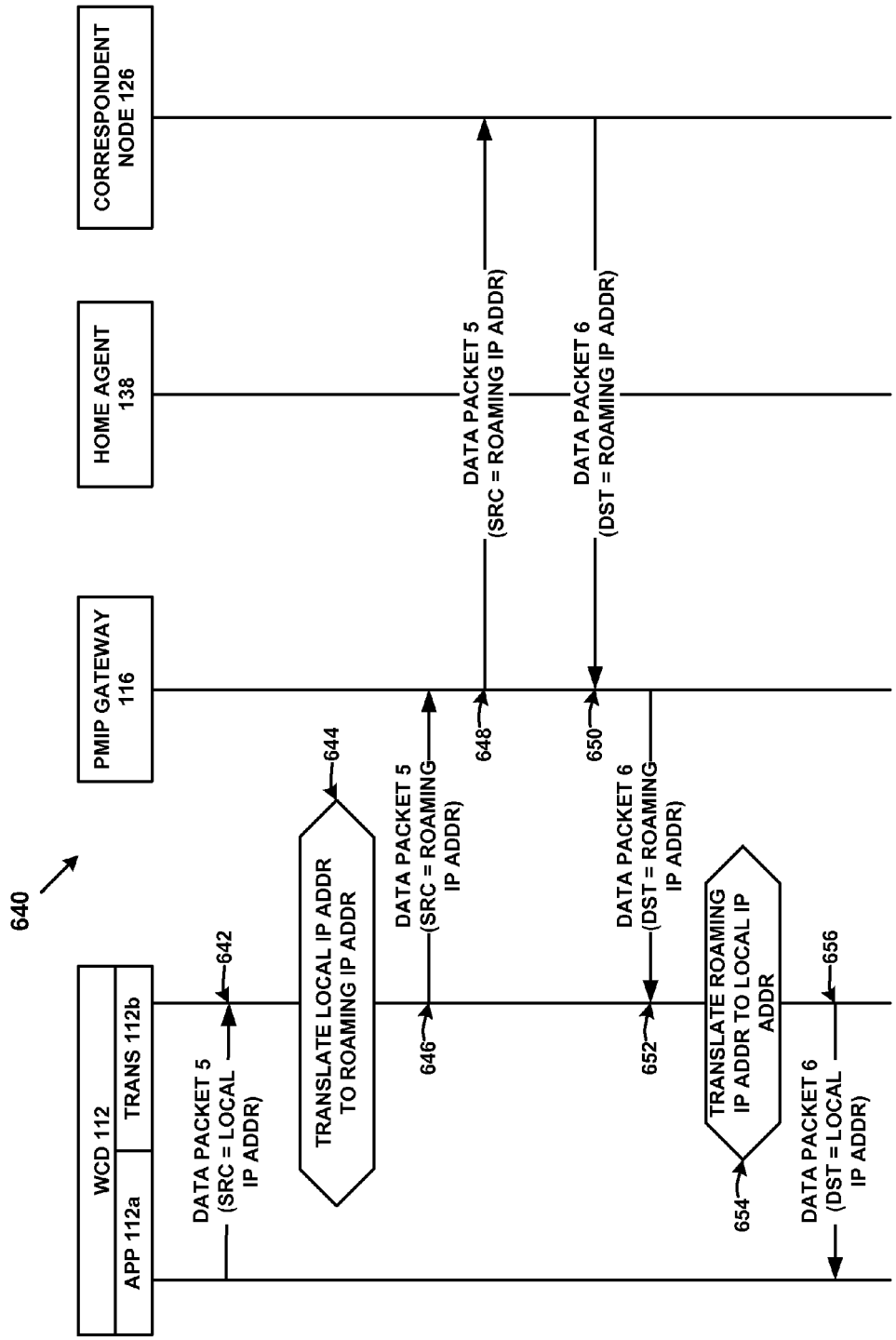

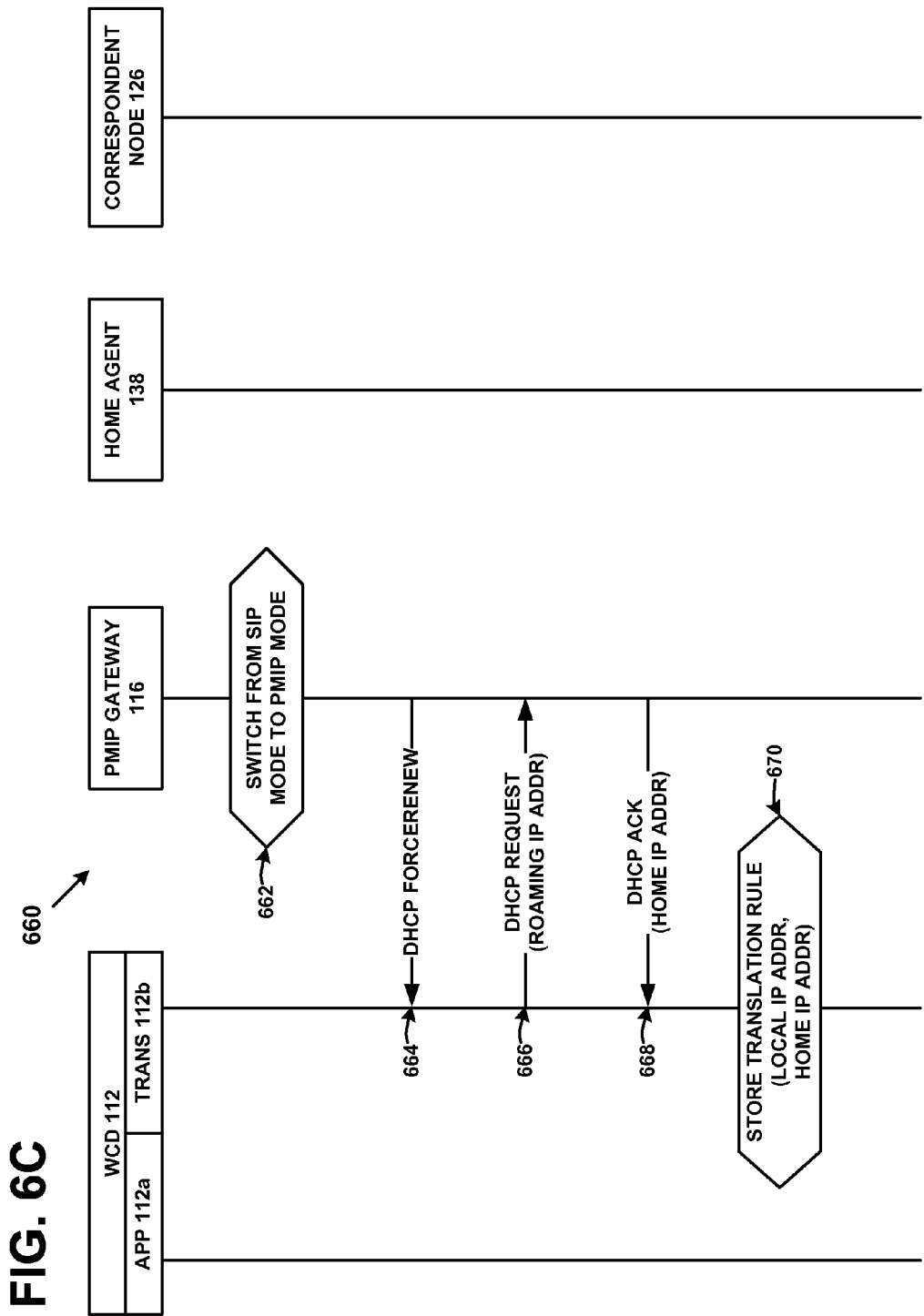

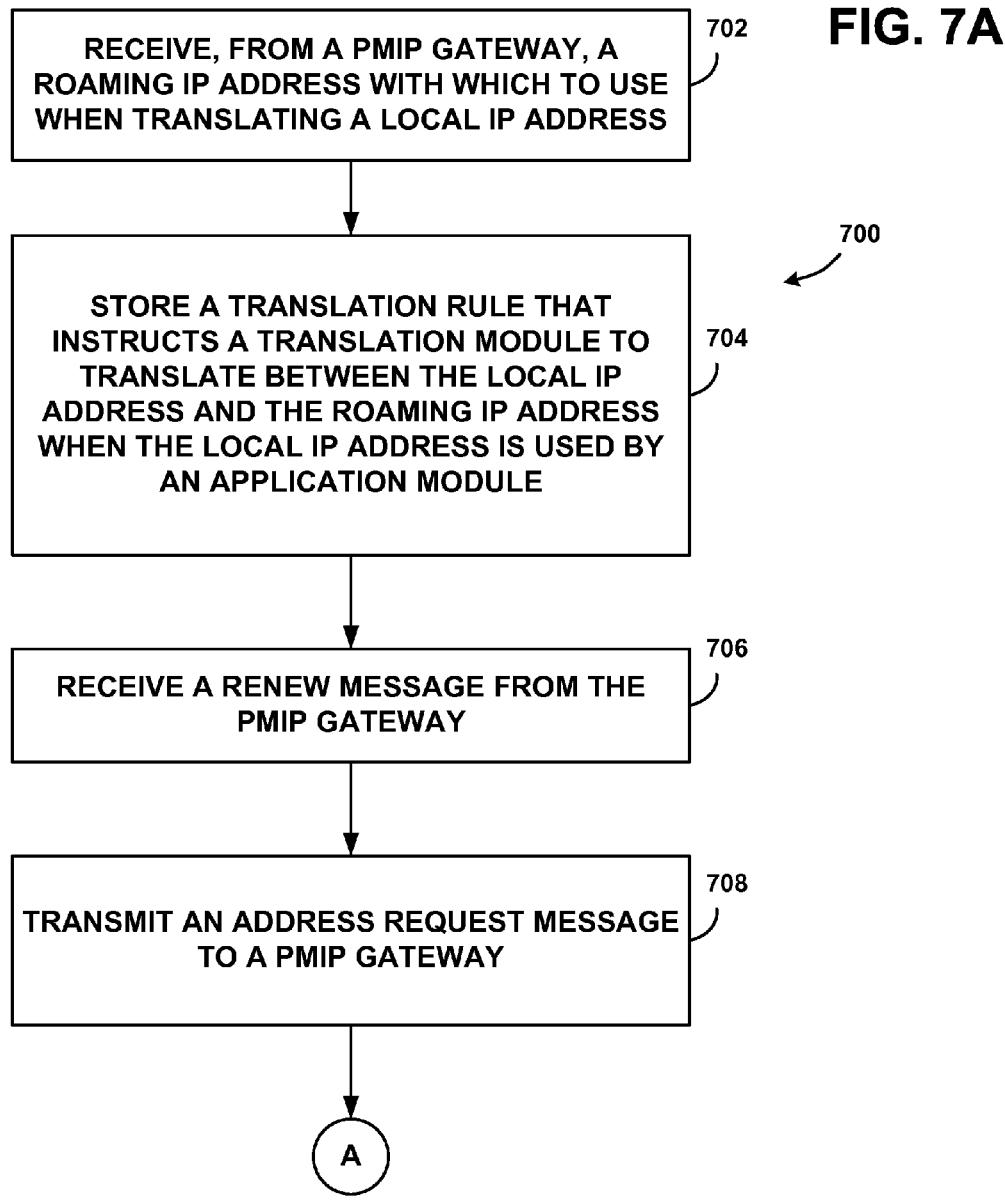

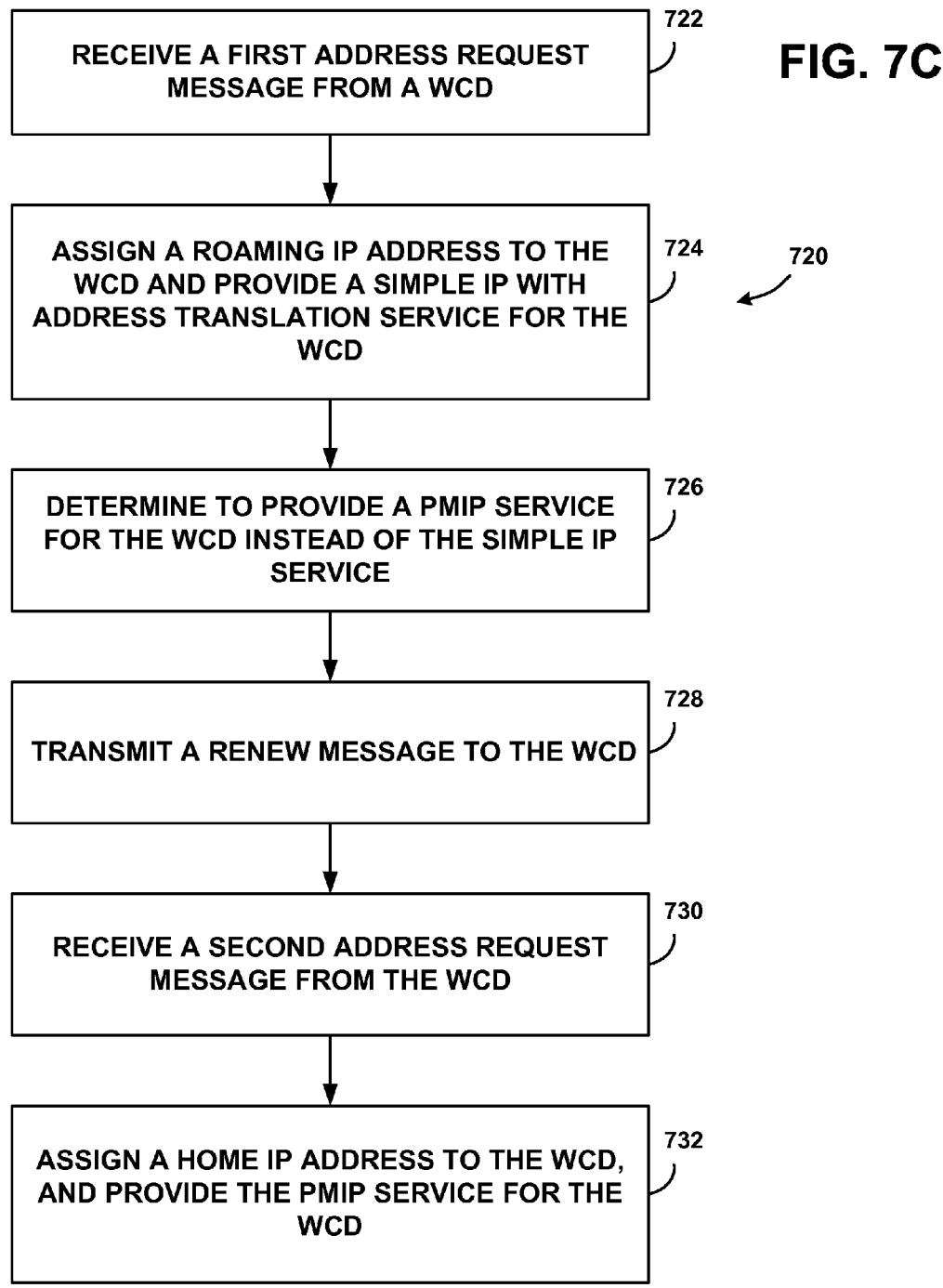

SUPPORTING SIMPLE IP WITH ADDRESS TRANSLATION IN A WIRELESS COMMUNICATION DEVICE

REFERENCE TO RELATED APPLICATION

This application is related to a co-pending application entitled "Supporting Simple IP with Address Translation in a Proxy Mobile IP Gateway," filed on the same day as this application, the entirety of which is hereby incorporated by reference.

BACKGROUND

Wide area wireless networks are often arranged to allow wireless communication devices (WCDs) to use an extension of the Internet Protocol that supports WCD mobility, such as mobile Internet Protocol (IP) or proxy mobile IP (PMIP). When a WCD employs mobile IP, the WCD is assigned a home IP address by a mobile IP home agent in the WCD's home network. When the WCD roams to a foreign network, the WCD directly or indirectly registers with a mobile IP foreign agent in the foreign network and informs the home agent that it (the WCD) is being granted network access via the foreign agent. Then, communications between the WCD and correspondent nodes are encapsulated (tunneled) between the foreign agent and the home agent.

In the case of PMIP, the WCD may register with a PMIP gateway, which is typically in the foreign network. The PMIP gateway conducts a mobile IP transaction with the mobile IP home agent on behalf of the WCD, such that the WCD is assigned a home IP address by a mobile IP home agent. In this way, the WCD may not be aware of the mobile IP transactions between the PMIP gateway and the home agent, and may not even need to support the mobile IP protocol. Similar to mobile IP, communications between the WCD and correspondent nodes are tunneled between the PMIP gateway and the home agent.

These mobile IP and PMIP tunnels serve at least two purposes. First, since the home agent assigns the WCD a home IP address from the home network, any communications from correspondent nodes to this home IP address will be initially routed to the home network, rather than directly to the WCD. Thus, the tunneling delivers these communications from the home network to the WCD. Second, the WCD may have registered to use services that are available in the home network. Since the tunneling routes all of the WCD's communications via the home network, the WCD can still take advantage of these services while roaming.

Nonetheless, the physical and/or topological distance between the foreign agent and the home agent (in the case of mobile IP), or between the PMIP gateway and the home agent (in the case of PMIP) may be significant. Thus, it can be expensive to backhaul communications from thousands, or even millions, of WCDs to and from home agents.

OVERVIEW

In some situations, it is possible to avoid the expense associated with mobile IP and PMIP tunnel backhaul for roaming WCDs. In particular, a WCD may not be registered to use services offered by the home network, may be arranged to not use home network services when roaming, or may instead use services available on the foreign network. Thus, the WCD's use of tunneled backhaul to the home network may be unnecessary for purposes of granting the WCD access to home network services.

If the WCD's arrangement, or other network conditions, obviates the need to backhaul the WCD's communications via the home network, it may be advantageous to support ways in which the WCD can be provided network access without requiring this backhaul. In particular, a PMIP gateway may serve the WCD with a form of simple-IP access via the foreign network, even though the WCD was assigned and uses a home IP address from a home agent.

When using this form of simple IP, example embodiments may make use of address translation, either in the PMIP gateway or in the WCD itself. Specifically, in packets the WCD transmits or receives, the PMIP gateway or WCD may translate the packets' source and/or destination addresses between the home IP address and a simple IP address (hereafter a "roaming IP address"). Preferably, the home IP address is used by applications executing on the WCD, and the roaming IP address is assigned to the WCD by the PMIP gateway. When serving a WCD via this simple IP with address translation mode, the PMIP gateway may refrain from routing the WCD's communications through a tunnel to a home agent, despite the WCD's continued use of the home IP address. Also, communications from correspondent nodes to the WCD may be routed more or less directly to the foreign network without necessarily traversing the home network. In this way, backhaul between the foreign network and home network may be avoided or reduced.

Nonetheless, there may be situations in which a WCD, served by simple IP with address translation, may be better served by a PMIP service. For instance, the WCD may be in a situation or environment where it is likely that the WCD will be handed off from the foreign network to another network that supports or requires PMIP or mobile IP services (e.g., the home network). In this case and potentially in other cases as well, it may be advantageous for the PMIP gateway to switch from the simple IP with address translation mode to a PMIP mode prior to the handoff, so that the handoff occurs in a minimally-disruptive fashion.

Accordingly, in an example embodiment, a PMIP gateway may be operable to serve WCDs via either a simple IP with address translation mode or a PMIP mode. While the PMIP gateway is serving a given WCD in the simple IP with address translation mode, the PMIP gateway may determine that the given WCD is likely to be handed off to a network that requires the PMIP mode or a mobile IP mode. In response to making this determination, the PMIP gateway may change to serve the given WCD with the PMIP mode. Advantageously, this example embodiment avoids having to backhaul the WCD's traffic to the home network for at least a portion of the time that the WCD is using the roaming network.

Although this embodiment may feature address translation at the PMIP gateway, other embodiments may accomplish the same or similar goals, but utilize address translation at other devices instead, such as the WCD. For instance, individual applications executing on the WCD may be assigned a local IP address. Preferably, the local IP address is an IP address that has significance only within the WCD and is used for communications internal to the WCD. The local IP address may be, for example, a loopback IP address or a private IP address. Then, the WCD may translate between the local IP address and the roaming IP address, or between the local IP address and the home IP address, transparently to the applications.

Thus, in another embodiment, a WCD may contain an application module and a translation module. The application module may be assigned a local IP address to which the application module binds and the application module uses. However, the translation module may attempt to hide the application module's use of this local address. Thus, for a packet transmitted by the application module, the translation module may translate the packet's source address from the local IP address to a different IP address (e.g., a roaming IP address or a home IP address) that has been assigned to the WCD by a PMIP gateway or a home agent. Similarly, for a packet transmitted to the application module, the translation module may translate the packet's destination address from the roaming IP address or home IP address to the local IP address. Like the previous embodiment, this embodiment also avoids having to backhaul the WCD's traffic to the home network when the WCD is served by simple IP with address translation mode.

Therefore, in general, the PMIP gateway may initially determine to serve a WCD via PMIP or via simple IP with address translation based on network conditions and/or configurations. As the network conditions and/or configurations change, the PMIP gateway may switch from serving the WCD in PMIP mode to simple IP with address translation mode, or from serving the WCD in simple IP with address translation mode to PMIP mode.

These and other aspects and advantages will become apparent to those of ordinary skill in the art by reading the following detailed description, with reference where appropriate to the accompanying drawings. Further, it should be understood this overview and other description throughout this document are provided merely for purposes of example and are not intended to limit the scope of the invention as claimed.

BRIEF DESCRIPTION OF THE DRAWINGS

FIG. 3A is a first message flow diagram, in accordance with an example embodiment;

FIG. 3B is a second message flow diagram, in accordance with an example embodiment;

FIG. 4B is a second flow chart, in accordance with an example embodiment;

FIG. 6B is a fifth message flow diagram, in accordance with an example embodiment;

FIG. 6C is a sixth message flow diagram, in accordance with an example embodiment;

FIG. 7A is a third flow chart, in accordance with an example embodiment;

FIG. 7C is a fifth flow chart, in accordance with an example embodiment; and

DESCRIPTION

Disclosed herein are methods and devices for supporting simple IP with network address translation in a WCD and/or a PMIP gateway. In particular, the PMIP gateway may switch between serving the WCD in a PMIP mode and a simple IP with address translation mode. The address translation may occur at the PMIP gateway or the WCD. By employing the various embodiments herein, the amount of traffic that passes between the WCD's home network and a foreign network in which the WCD is roaming can be reduced.

I. Network Architecture

Figure 1:
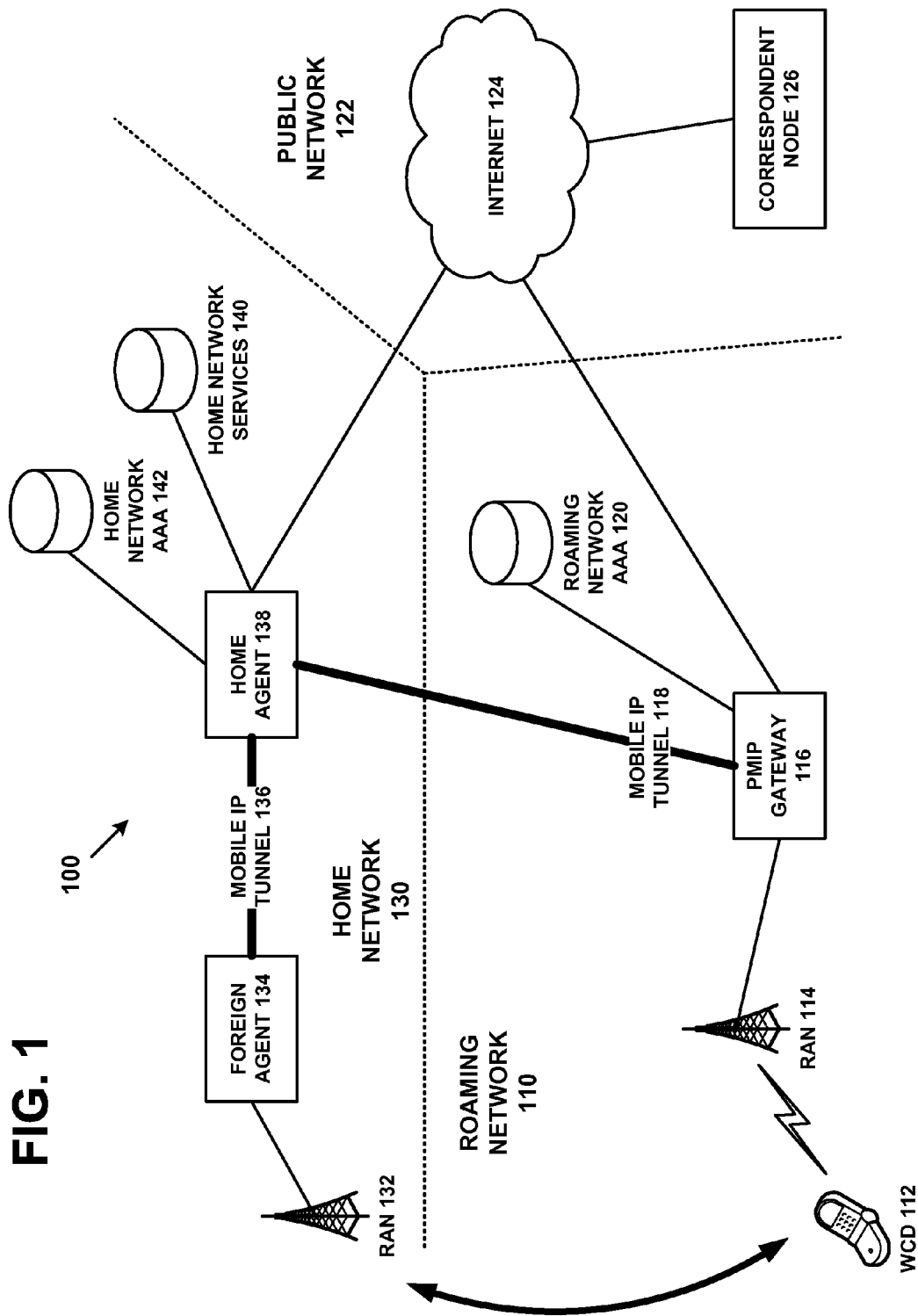
FIG. 1 depicts a communication system, in accordance with an example embodiment.

FIG. 1 depicts an exemplary communication system 100 in which these embodiments can be carried out or deployed. At a high level, communication system 100 comprises a roaming network 110, a home network 130, and a public network 122. Each of these three networks may be connected to one another so that the devices on any one network can communicate with devices on any of the other networks. For instance, roaming network 110 may be connected to home network 130 and public network 122, while home network 130 may also be connected to public network 122. Alternatively, roaming network 110 may be indirectly connected to home network 130 so that roaming network 110 communicates with home network 130 via public network 122.

Each of these networks is preferably a packet-switched network that supports packet-switched communication between any of the respective devices shown in FIG. 1. However, that is not to say that any of these networks cannot include circuit-switching devices or links as well. To the extent that any device on these networks supports packet switching, it is presumed herein that these devices use IP. However, other packet-switching protocols may be used instead of IP without departing from the scope of the invention.

It should be understood that each of these networks may contain more or fewer devices than shown in FIG. 1. Further, any device shown in FIG. 1 may be either a physically distinct device, or a module or function that is integrated in a physical device with other modules and functions. Thus, the components of each of roaming network 110, public network 122, and home network 130 may be able to be combined with one another, in whole or in part, without departing from the scope of the invention.

Further, each of these networks may also contain various types of switches, routers, gateways, and firewalls, as well as links connecting these and other devices to one another. Overall, communication system 100 is an illustrative example that has been simplified for purposes of clarity. Thus, this depiction of communication system 100 should not be viewed as limiting, and the embodiments herein may be applied to various types of communication systems now known or developed in the future.

a. Roaming Network

Roaming network 110 may include a WCD 112, a radio access network (RAN) 114, a PMIP gateway 116, and a roaming network authentication, authorization, and accounting (AAA) server 120. WCD 112 could be a wireless telephone, a wireless personal digital assistant, a wirelessly equipped laptop computer, a wireless router, or another type of mobile or fixed wireless device. Preferably, a WCD is a subscriber device that is manipulated by a human in order to establish circuit-switched or packet-switched voice and/or data calls. However, a WCD could also be an automated device without a human interface. A WCD may be associated with zero or more RANs at a time and may use the wireless coverage areas of these RANs to communicate with correspondent nodes, such as web servers, email servers, gaming servers, short message service (SMS) servers, signaling and media nodes used to support real time protocols, and other WCDs or wireline devices.

Each WCD may be associated with a home network. Therefore, for instance, WCD 112 may be associated with home network 130. A WCD's home network is typically controlled and/or operated by the WCD's wireless service provider. For example, a user may purchase or lease a WCD from a wireless service provider, and the WCD may be configured to use the wireless service provider's network when the WCD is within range of that network. Further, a WCD, such as WCD 112, may be configured to take advantage of services provided in home network 130. To do so, communication network 100 may be arranged to route all packet data traffic to or from WCD 112 through a mobile IP home agent, such as home agent 138, in home network 130. This routing may occur even when WCD 112 is using another wireless service provider's network.

RAN 114 may represent one or more devices that, alone or in conjunction with one another, provide wireless services for WCD 112, and possibly other WCDs as well. Thus, RAN 114 may contain one or more base transceiver stations (BTSs) that radiate to define one or more wireless coverage areas used by these WCDs. RAN 114 may also contain one or more radio network controllers (RNCs). Along with performing other tasks, an RNC may manage the wireless resources associated with a BTS, and route traffic to and from the BTS. Additionally, an RNC may be able to facilitate the handoff of a WCD from one wireless coverage area to another. In addition to or instead of an RNC, a base station controller (BSC), or some other type of device, may be used to control the operation of BTSs. Regardless of the exact configuration, RAN 114 may be communicatively coupled to other devices, such as PMIP gateway 116.

In order to provide wireless service to WCD 112, the wireless coverage area(s) defined by RAN 114 may include an air interface that comprises one or more forward link and/or reverse link channels. These channels may be formed via a set of orthogonal Code Division Multiple Access (CDMA) codes, each of which may be used to modulate the data transmitted on a particular channel. Through the forward and reverse link channels, RAN 114 and WCD 112 may exchange signaling and bearer data.

However, CDMA is not the only technology that can provide wireless forward and reverse link channels, and other technologies may be used instead. These other technologies include, but are not limited to, Worldwide Interoperability for Microwave Access (WIMAX®), Universal Mobile Telecommunications System (UMTS®), Long Term Evolution (LTE®), IDEN®, or 802.11 (Wifi).

PMIP gateway 116 may be a router-like device that manages the connectivity of WCDs to a packet-switched network. Example devices that may perform PMIP gateway functions include CDMA packet data serving nodes (PDSNs) and WIMAX® access serving network gateways (ASN-GWs). In an example embodiment, PMIP gateway 116 may serve tens, hundreds or thousands of WCDs via point to point protocol (PPP) links to each WCD. However, a PPP link to a WCD is not required for PMIP gateway 116 to serve a WCD. Furthermore, PMIP gateway 116 may be co-located with or contain mobile IP foreign agent functionality.

As will be described in more detail in the following sections, PMIP gateway 116 may perform proxy mobile IP functions on behalf of one or more WCDs in roaming network 110. Thus, PMIP gateway 116 may be operable to establish one or more mobile IP tunnels between PMIP gateway 116 and various mobile IP home agents. For example, in communication system 100, PMIP gateway 116 may establish a mobile IP tunnel 118 between PMIP gateway 116 and a home agent 138. Mobile IP tunnel 118 may carry, for example, packet data traffic to and from WCD 112. Mobile IP tunnel 118 could potentially take one of various forms, including that of an IP-in-IP tunnel, a Generic Routing Encapsulation (GRE) tunnel, or an IP Security (IPSec) tunnel, and so on.

While FIG. 1 depicts mobile IP tunnel 118 as a direct connection between PMIP gateway 116 and home agent 138, it should be understood that this depiction reflects a possible logical arrangement of mobile IP tunnel 118. Thus, packets passing through mobile IP tunnel 118 may actually traverse a public network 122 or a private peering point (not shown) between roaming network 110 and home network 130.

Roaming network 110 may also include roaming network AAA 120. An AAA server, such as roaming network AAA 120, is typically a device that has access to a profile for each WCD permitted to use roaming network 110. In the case of WCD 112, roaming network AAA 120 may either maintain a copy of this WCD's profile, or may access the profile as needed by communicating with a home network AAA 142. Such a profile may contain an indication of the identity of the WCD and the WCD's subscriber (e.g., a user). For example, a profile for a given WCD may include the given WCD's network access identifier (NAI), mobile directory number (MDN), international mobile subscriber identifier (IMSI), electronic serial number (ESN), mobile equipment identifier (MEID), username, password, and/or any other information, general or specific, related to the given WCD.

Roaming network AAA 120 may communicate with other devices via one or more AAA protocols. For example, roaming network AAA 120 may employ the remote authentication dial in subscriber service (RADIUS) and/or DIAMETER protocols to communicate with foreign agents, home agents, PMIP gateways, and other AAA servers. Thus, although not shown, there may be a RADIUS or DIAMETER interface between roaming network AAA 120 and home network AAA 142.

b. Home Network

Home network 130 may include a RAN 132, a foreign agent 134, home agent 138, home network services 140, and home network AAA 142. Similar to RAN 114, RAN 132 may comprise one or more BTSs, RNCs, and/or other devices that, in conjunction with one another, provide wireless air interface service to WCDs. RAN 132 may also support various wireless technologies, such as CDMA, WIMAX®, UMTS®, LTE®, IDEN®, or 802.11. In particular, WCD 112 may be handed off between RAN 114 and RAN 132 as WCD 112 changes geographic location. Additionally or alternatively, WCD 112 could be handed off between these RANs as the respective signal strength that WCD 112 receives from each RAN fluctuates due to attenuation, interference, dispersion, and/or distortion.

Foreign agent 134 may be similar to PMIP gateway 116 in the sense that foreign agent 134 may be a router-like device that manages the connectivity of WCDs to a packet-switched network. Examples devices that may perform foreign agent functions also include CDMA PDSNs and WIMAX® ASN-GWs. Thus, a foreign agent may also perform PMIP gateway functions. Also like PMIP gateway 116, foreign agent 134 may serve tens, hundreds or thousands of WCDs via either PPP or some other protocol.

Additionally, foreign agent 134 may perform mobile IP functions on behalf of one or more WCDs in home network 130. Thus, foreign agent 134 may be operable to establish one or more mobile IP tunnels between foreign agent 134 and various mobile IP home agents. For example, in communication system 100, foreign agent 134 may establish a mobile IP tunnel 136 between foreign agent 134 and home agent 138. Like mobile IP tunnel 118, mobile IP tunnel 134 may carry, for example, packet data traffic to and from WCD 112 and/or other WCDs. Also like mobile IP tunnel 118, mobile IP tunnel 136 may take the form of an IP-in-IP tunnel, a GRE tunnel, an IPSec tunnel, or some other form of tunnel.

Home agent 138 is preferably an anchor point for WCDs that support mobile IP. While such a WCD may change its point of attachment from one RAN to another (and potentially from one foreign agent or PMIP gateway to another foreign agent or PMIP gateway) as it roams between wireless coverage areas, the WCD preferably maintains a registration with the same home agent. Furthermore, in order to maintain a substantially static home IP address, the WCD may receive a home IP address assignment from home agent 138. Advantageously, allowing the WCD to maintain a substantially static home IP address at a home agent 138 rather than at a foreign agent or PMIP gateway permits the WCD to preserve its communication sessions across handoffs.

To that point, it should be understood that when an IP address used by applications executing on a device is changed, the applications may have to disconnect any ongoing communication sessions and then re-establish these sessions using the new IP address. Thus, if a user is engaged in web browsing, file transfers, voice over IP, or other types of real-time or non-real-time transactions, the changing of an IP address can interrupt these sessions for a few seconds or more. Consequently, it is desirable to avoid having to change the IP address of an application, and the use of mobile IP or PMIP is one way of doing so.

Home network 130 may also include home network AAA 142. Like roaming network AAA 120, home network AAA 142 may have access to a profile for each WCD permitted to use home network 110. Home network AAA 142 may also communicate with other devices via RADIUS, DIAMETER, or other AAA protocols.

Additionally, home network 130 may include home network services 140. While depicted as a single device in FIG. 1, home network services 140 may entail a vast array of devices operating one or more services. Some example services that could be deployed in home network 130 include encryption (e.g., virtual private networking), data compression, content (e.g., music, movies) streaming or download, social networking, email, calendar, backup and restore, and gaming services. These services may only be available to WCDs that use home agent 138 or other home agents in home network 130.

c. Public Network

Public network 122 may comprise the Internet 124, as well as any other publicly-accessible network. Public network 122 may be communicatively connected to roaming network 110 and/or home network 130. Thus, via public network 122, WCD 112 may be able to communicate with a correspondent node 126, as well as other devices available on public network 122. Correspondent node 126 may be, for example, another WCD, a server, or any other type of networked device. Public network 122 may comprise one or more local-area and/or wide-area networks, each potentially operated by a different entity.

II. Simple IP, Mobile IP and PMIP

Generally speaking, simple IP, mobile IP, and PMIP are three different techniques for providing and maintaining an IP address for a WCD such as WCD 112. In order to appreciate the advantages and disadvantages of these techniques, a brief description of each follows.

a. Simple IP

Simple IP is typically a straightforward method for assigning an IP address to a WCD. With respect to communication network 100, PMIP gateway 116 and/or foreign agent 134 may provide simple IP services. Thus, for example, if WCD 112 registers for service with PMIP gateway 116, PMIP gateway 116 may select and assign an IP address to WCD 112 from a pool of IP addresses that is configured on PMIP gateway 116. Alternatively, PMIP gateway 116 may receive the IP address to assign from another device such as roaming network AAA 120. Thus, roaming network AAA 120 may be configured with, or otherwise have access to, a pool of IP addresses.

It should be understood that a pool of IP addresses typically comprises one or more ranges of IP addresses from which individual IP addresses can be assigned to WCDs. Once assigned to a WCD, an IP address may be marked as assigned so that it is not assigned to more than one WCD at a time. In the case of simple IP, assigning an IP address to a WCD preferably entails transmitting the IP address to the WCD for the WCD to use when communicating with other devices. It should also be understood that a WCD may receive a simple IP address assignment in a number of ways including via PPP or the Dynamic Host Configuration Protocol (DHCP).

Also, PMIP gateway 116 may authenticate or authorize WCD 112 for simple IP service in the process of receiving the IP address to assign. Thus, for example, PMIP gateway 116 may conduct a DHCP transaction with WCD 112, during which WCD 112 transmits an indication of its userid and password to PMIP gateway 116. Then, PMIP gateway 116 may query roaming network AAA 120 in order to determine whether this transmitted indication matches information in a profile for WCD 112. If so, roaming network AAA 120 may transmit some form of acknowledgement, possibly including the assigned IP address, to PMIP gateway 116.

Once WCD 112 receives and adopts the assigned IP address for use, at least some packets transmitted by WCD 112 may contain the assigned IP address as a source address. For instance, when communicating with correspondent node 126, WCD 112 may transmit, to PMIP gateway 116, packets specifying the assigned IP address as a source address. In turn, PMIP gateway 116 may forward these packets to correspondent node 126 via roaming network 110 and public network 122. Conversely, packets transmitted from correspondent node 126 to WCD 112 may contain the assigned IP address as a destination address. These packets may traverse public network 122 and/or roaming network 110 on their way to PMIP gateway 116. Public network 122 and/or roaming network 110 may forward the packets in the direction of PMIP gateway 116 because PMIP gateway 116, or another device in roaming network 110, may advertise a route to the destination address. Regardless of the path taken, PMIP gateway 116 may forward the packets to WCD 112.

Notably, when the packets travel between the correspondent node and PMIP gateway 116, they are preferably not tunneled. Instead, they may traverse a more or less direct path from the correspondent node to PMIP gateway 116, and vice versa.

While simple IP is advantageous by exhibiting relatively straightforward operation, simple IP does have the disadvantage that WCD 112 may be required to change its assigned IP address as it roams from network to network. For instance, suppose that WCD 112 is served by PMIP gateway 116, and is using an IP address assigned by PMIP gateway 116. If WCD 112 is handed off to a new wireless coverage area that is associated with foreign agent 134, WCD 112 may be assigned a new IP address. In this case, any ongoing sessions between WCD 112 and correspondent nodes may be terminated when WCD 112 adopts the new IP address for use. In order to avoid the potentially deleterious impact of terminating communications sessions due to handoff, mobile IP or PMIP may be employed.

b. Mobile IP

Mobile IP uses a foreign agent and a home agent, such as those depicted in home network 130, to assign an IP address from home network 130 to WCD 112. To initiate this process, WCD 112 may use the mobile IP protocol to seek a home IP address assignment.

For instance, if WCD 112 roams to a wireless coverage area served by foreign agent 134, WCD 112 may transmit a mobile IP registration request to foreign agent 134. After optionally authenticating WCD 112 (e.g., via home network AAA 142 or some other AAA server), foreign agent 134 may forward the mobile IP registration request to home agent 138. Home agent 138, upon receiving the mobile IP registration request, may allocate and assign a home IP address for use by WCD 112. Home agent 138 may select the home IP address from an address pool configured on home agent 138. Alternatively, home agent 138 may receive the home IP address from home network AAA 142, WCD 112, or some other entity. However, if WCD 112 already has a home IP address assignment from home agent 138, home agent 138 may reassign the same home IP address to WCD 112.

Regardless, home agent 138 may transmit the home IP address to foreign agent 134 in a mobile IP registration reply. Upon receiving this mobile IP registration reply, foreign agent 134 may forward the mobile IP registration reply to WCD 112. In this way, WCD 112 may receive the home IP address and may adopt it for use. Further, this mobile IP transaction between foreign agent 134 and home agent 138 may serve to establish a mobile IP tunnel (e.g., mobile IP tunnel 136) between these two devices, so that some or all communication to and from WCD 112 traverses the mobile IP tunnel.

While mobile IP is an effective means for allowing a WCD to maintain a consistent home IP address as the WCD roams from network to network, mobile IP requires support in the WCD for the mobile IP protocol. This adds complexity to the design of the WCD, as the WCD's mobile IP implementation may have to interact with other address management protocols such as PPP and DHCP. Thus, in order to reduce WCD complexity, or for other reasons, PMIP may be used.

c. PMIP

PMIP may be similar in some ways to mobile IP, but uses a PMIP gateway, such as PMIP gateway 116, instead of or in addition to a foreign agent. Home agent 138 still assigns an IP address from home network 130 to WCD 112. To trigger this assignment, WCD 112 may use an address management protocol, such as PPP or DHCP, to seek an IP address assignment from a PMIP gateway.

For instance, if WCD 112 initializes in a wireless coverage area served by PMIP gateway 116, WCD 112 may transmit a DHCP DISCOVER message to PMIP gateway 116. After optionally authenticating WCD 112 (e.g., via roaming network AAA 120, home network AAA 142 or some other AAA server), PMIP gateway 116 may transmit a mobile IP registration request to home agent 138. Home agent 138, upon receiving the mobile IP registration request, may allocate and assign a home IP address for use by WCD 112.

As is the case for mobile IP, home agent 138 may transmit the home IP address in a mobile IP registration reply to the sender of the mobile IP registration request. PMIP gateway 116 may receive the mobile IP registration reply, and may then complete the DHCP transaction with WCD 112, assigning WCD 112 the home IP address in the process. In this way, WCD 112 may receive the home IP address and may adopt it for use. Further, this mobile IP transaction between PMIP gateway 116 and home agent 138 may serve to establish a mobile IP tunnel (e.g., mobile IP tunnel 118) between these two devices. Thus, in general, PMIP may avoid requiring support of the mobile IP protocol on a WCD, and yet may establish a mobile IP tunnel for transport of the WCD's traffic between a PMIP gateway and a home agent.

III. Wireless Coverage Areas for the Roaming Network and the Home Network

Figure 2:
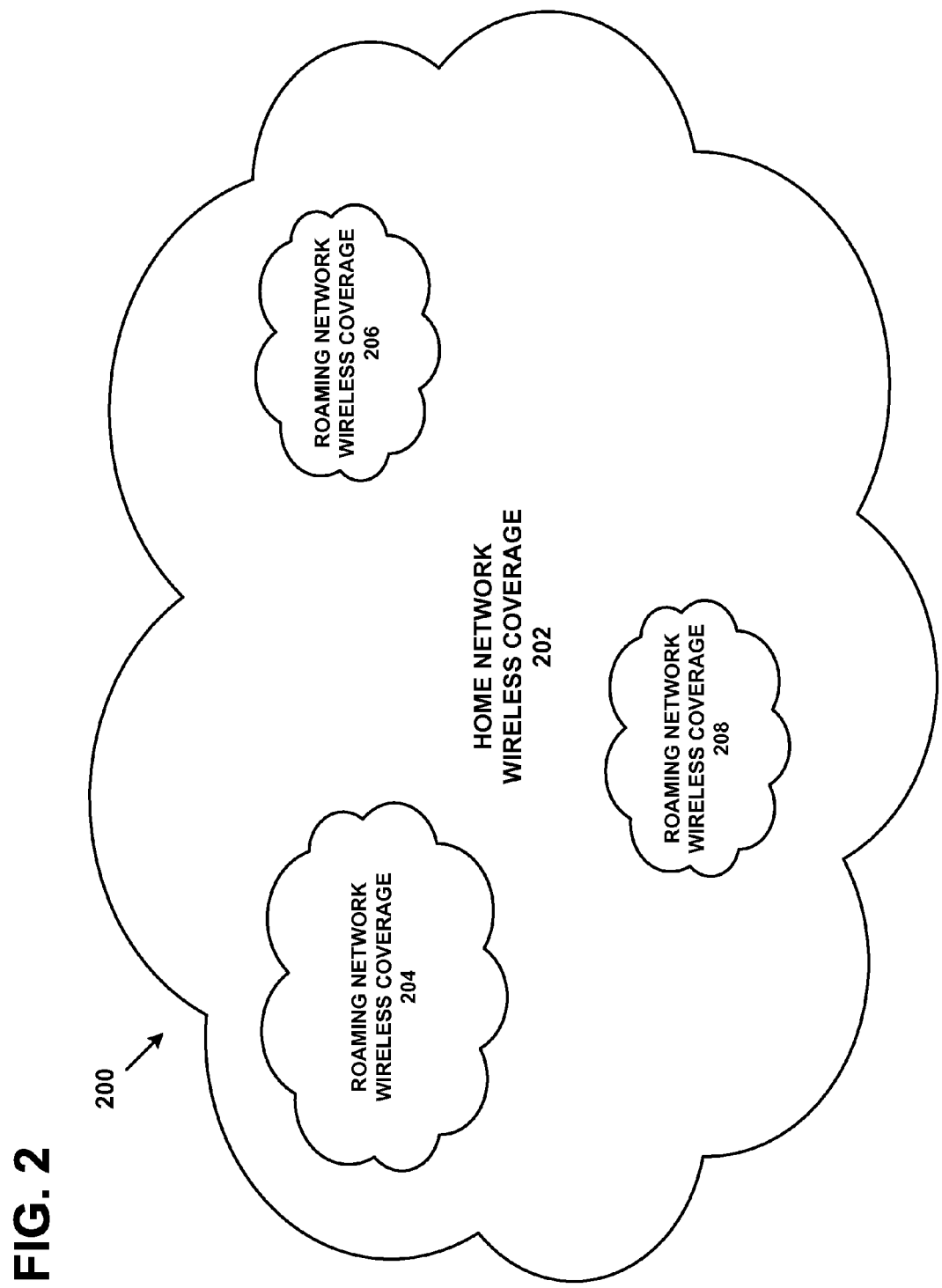
FIG. 2 depicts a home network's wireless coverage area overlaid with a roaming network's wireless coverage area, in accordance with an example embodiment.

In order to appreciate situations in which a WCD may be handed off from a roaming network to a home network, or vice versa, FIG. 2 illustrates an example of wireless network coverage for a home network, such as home network 130, and for one or more roaming networks. Home network wireless coverage 202 may be a combination of the coverage footprint(s) of one or more wireless coverage area(s) that are part of home network 130. Each of roaming network wireless coverage 204, 206, and 208 may also be a combination of the coverage footprint(s) of one or more wireless coverage area(s). Further, roaming network wireless coverage 204, 206, and 208 may each be part of a different roaming network or part of the same roaming network. Thus, for example, roaming network wireless coverage 204, 206, and 208 may all be controlled by the operator of roaming network 110 or may be controlled by different entities. Additionally, home network wireless coverage 202 and roaming network wireless coverage 204, 206, and 208 may be controlled and/or operated by the same entity.

FIG. 2 illustrates a possible arrangement for providing wireless coverage to a geographical area. In particular, home network wireless coverage 202 may be based on a widely-deployed current-generation wireless technology, while roaming network wireless coverage 204, 206, and 208 may be based on a newer, next generation wireless technology. Thus, for instance, home network wireless coverage 202 may be coverage from CDMA 1xRTT or Evolution-Data Only (EVDO) technologies, and may have a large footprint. However, each of roaming network wireless coverage 204, 206, and 208 may be provided by smaller footprints of WIMAX® technologies. (Service providers often deploy newer technologies, such as WIMAX®, in "islands" in order to test these technologies before deploying them on a wider scale.)

Alternatively, home network wireless coverage 202 may be based on a lower-speed but cost-effective wireless technology, while roaming network wireless coverage 204, 206, and 208 may be based on a higher-speed but less cost-effective wireless technology. Thus, for example, home network wireless coverage 202 may be coverage from LTE® technologies, and may have a large footprint. However, each of roaming network wireless coverage 204, 206, and 208 may be provided using a small footprint of high-speed Wifi technologies. (Service providers may deploy Wifi in "islands" because it may be prohibitively expensive to deploy Wifi in a large footprint.)

Regardless of the exact technologies used to provide wireless coverage, WCDs may be arranged to prefer using the "islands" of roaming network wireless coverage 204, 206, and 208 over home network wireless coverage 202 when possible. For instance, these "islands" may provide high-speed wireless service or may be more spectrally efficient than home network wireless coverage 202, or may otherwise have more capacity than home network wireless coverage 202.

Suppose, for example, home agent 138 is located within home network wireless coverage 202 and PMIP gateway 116 is located within roaming wireless coverage area 204. Then, if WCD 112 is arranged to prefer wireless coverage area 204 over home network wireless coverage 202, WCD 112 may be served by PMIP gateway 116 when using roaming wireless coverage area 204. Accordingly, as discussed in Section I, this may result in traffic to and from WCD 112 being backhauled via home agent 138. In order to avoid this backhaul at least some of the time, PMIP gateway 116 may be arranged to provide simple IP with address translation, in addition to PMIP services, to WCD 112. Further, PMIP gateway 116 may be configured to prefer serving WCD 112 via simple IP with address translation rather than via PMIP.

However, it may be advantageous for PMIP gateway 116 to be able to switch between providing PMIP services and simple IP with address translation for WCD 112 as circumstances warrant. For example, if WCD 112 is unlikely to be handed off to home network 130, it may be advantageous for PMIP gateway 116 to use simple IP with address translation for WCD 112. On the other hand, it may be advantageous for PMIP gateway 116 to use PMIP services for WCD 112 if WCD 112 is likely to be handed off to home network 130.

Particularly, if PMIP gateway 116 is using simple IP with address translation for WCD 112, PMIP gateway 116 may switch to using PMIP services for WCD 112 when PMIP gateway 116 determines that WCD 112 is likely to be handed off to home network 130. This determination may take various forms.

In one possible embodiment, WCD 112 may be nearing a geographic boundary of the coverage of a roaming network wireless coverage (e.g., the edge of roaming network wireless coverage 204) and is therefore likely to be handed off to home network wireless coverage 202. One way in which the PMIP gateway could determine that the WCD is nearing the geographic boundary is for the PMIP gateway to receive geographic coordinates of the WCD, compare these geographic coordinates to the geographic boundary of the roaming wireless coverage area, and determine that the geographic coordinates of the WCD are within a given range of the geographic boundary of the roaming wireless coverage area. In another embodiment, WCD 112 may be receiving air interface signals from roaming network wireless coverage 204 at a poor signal quality while receiving air interface signals from home network wireless coverage 202 at a strong signal quality. In this situation, WCD 112 is also likely to be handed off to home network 130.

In both of these embodiments, PMIP gateway 116 may receive either a representation of a WCD's location, or representations of the WCD's received signal strengths, from other devices (e.g., one or more of WCD 112, RAN 114, or RAN 132). Based on such representations, PMIP gateway 116 may determine whether WCD 112 is likely to be handed off to home network 130. Alternatively, this determination may be made by some other device (e.g., one or more of WCD 112, RAN 114, or RAN 132), and this device may inform PMIP gateway 116 that WCD 112 is likely to be handed off to home network 130.

If WCD 112 were to be handed off to home network 130, WCD 112 would likely (for sake of argument) be served by foreign agent 134. Foreign agent 134, may, in turn, require the used of PMIP or mobile IP. Thus, after the handoff takes place, WCD 112 may begin communicating to correspondent nodes, such as correspondent node 126, with the home IP address instead of the roaming IP address. As discussed above, when an IP address used by either endpoint of a communication session changes, the communication session may be reset or restarted. Thus, if PMIP gateway 116 switches from simple IP with address translation mode to PMIP mode, or if WCD 112 is handed off to home network 130, the IP address with which correspondent node 126 communicates with WCD 112 may change from the roaming IP address to the home IP address. As a result, any ongoing communication sessions between correspondent node 126 and WCD 112 may be reset or restarted.

In order to avoid resetting or restarting such communication sessions, PMIP gateway 116 may seek to proactively switch from serving WCD 112 in simple IP with address translation mode to PMIP mode when WCD 112 is idle, or when WCD 112 is participating in few or no ongoing communication sessions. In this way, the impact of the switching can be reduced.

In other words, PMIP gateway 116 may be serving WCD 112 in simple IP with address translation mode, and may determine that WCD is likely to be handed off to home network 130. PMIP gateway 116 may also determine that WCD 112 is idle, or is participating in none or few ongoing communication sessions. In response to making these determinations, PMIP gateway 116 may switch to serving WCD 112 in PMIP mode.

It should be understood that reasons for a PMIP gateway switching between serving a WCD with simple IP with address translation mode and serving the WCD with PMIP mode may vary from the examples described above. Accordingly, the discussion in this section should not be construed as limiting. Additionally, a PMIP gateway may also switch between serving a WCD with PMIP mode and serving the WCD with simple IP with address translation mode.

IV. Simple IP with Address Translation in a PMIP Gateway

Figure 3C:
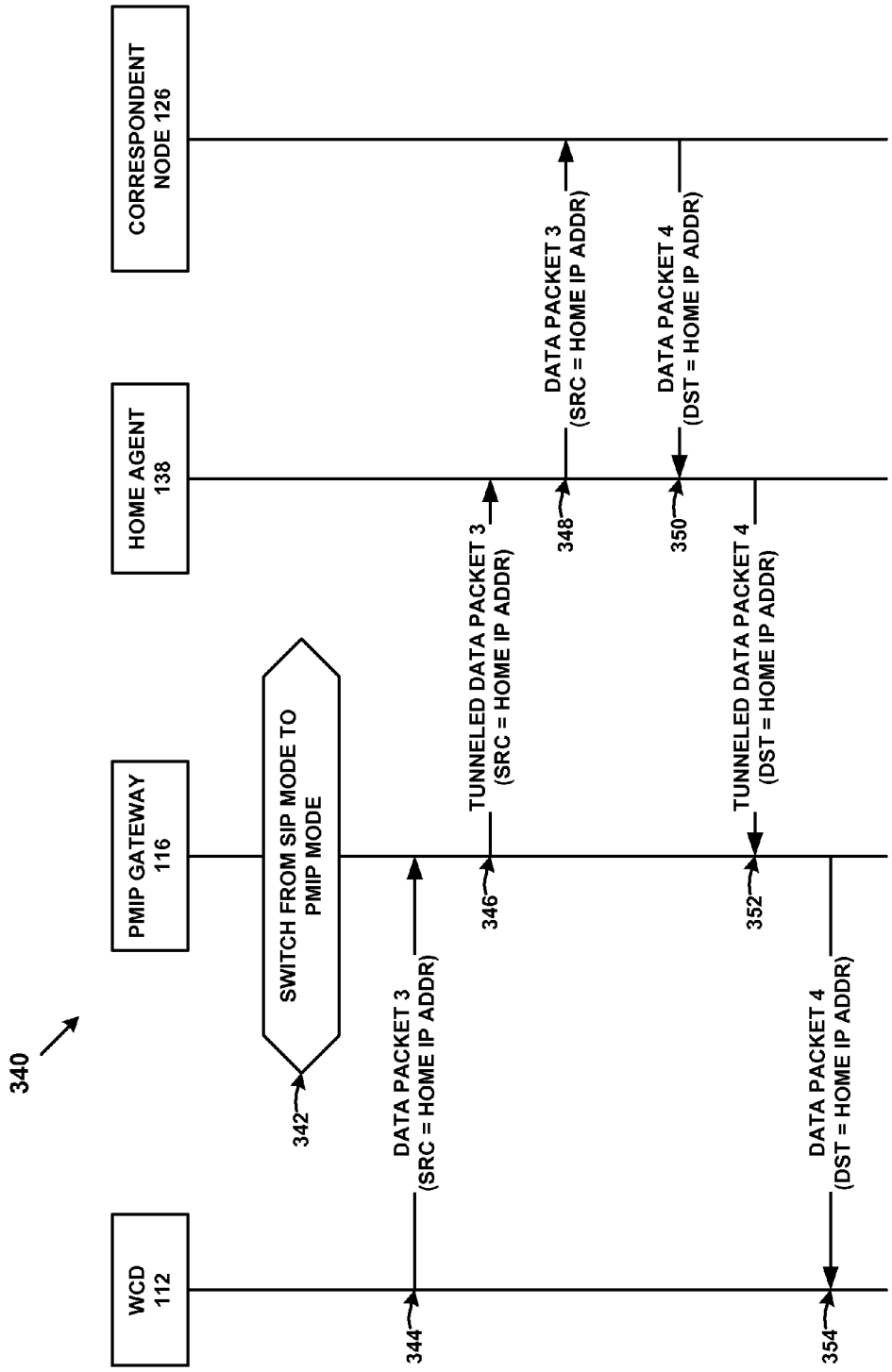
FIG. 3C is a third message flow diagram, in accordance with an example embodiment.
Figure 4A:
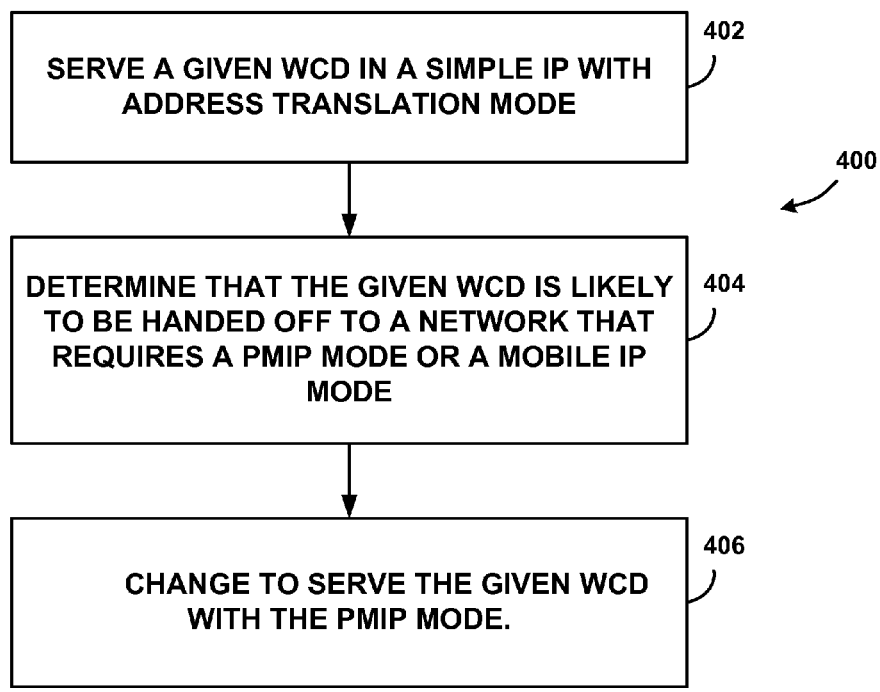
FIG. 4A is a first flow chart, in accordance with an example embodiment.

FIGS. 3A, 3B, and 3C are message flows and FIGS. 4A and 4B are flow charts that illustrate ways in which a PMIP gateway can provide simple IP with address translation for a WCD and can then switch to providing PMIP services for the WCD. These message flows and flow charts are not intended to be comprehensive and have been simplified for purposes of presentation. Thus, each of these message flows and flow charts may include more or fewer steps than provided in these figures, and any one of these message flows and flow charts may be combined with any other without departing from the scope of the invention.

a. Example Message Flows

FIG. 3A is a message flow 300 in which WCD 112 registers for PMIP service with a PMIP gateway 116, but PMIP gateway 116 initially may provide a simple IP with address translation service for WCD 112 instead of the PMIP service. At step 302, WCD 112 may transmit a DHCP DISCOVER message to PMIP gateway 116. At step 304, in response to receiving the DHCP DISCOVER message, PMIP gateway 116 may transmit a mobile IP registration request on behalf of WCD 112 to home agent 138. At step 306, after receiving the mobile IP registration request, home agent 138 may assign a home IP address to WCD 112. At step 308, home agent 138 may transmit a mobile IP registration reply, containing the assigned home IP address, to PMIP gateway 116.

At step 310, PMIP gateway 116 may assign a roaming IP address to WCD 112. PMIP gateway 116 may determine to assign the roaming IP address to WCD 112 despite home agent 138 also assigning the home IP address to WCD 112.

PMIP gateway 116 may do so by default (i.e., PMIP gateway 116 may exhibit this behavior for all WCDs that it serves), or PMIP gateway 116 may do so selectively for WCD 112 (i.e., PMIP gateway may be configured so that WCD 112 is one of a group of WCDs for which PMIP gateway 116 exhibits this behavior).

Regardless, at step 312, PMIP gateway 116 may transmit the home IP address to WCD 112 in a DHCP OFFER message. At step 314, WCD 112 may respond to the DHCP OFFER message with a DHCP REQUEST message, containing the home IP address. At step 316, PMIP gateway 116 may respond to the DHCP REQUEST message by transmitting a DHCP ACK message, also containing the home IP address, to WCD 112. At this point, the DHCP transaction may complete, and WCD 112 may have learned that it was assigned the home IP address.

At step 318, which may take place at any point after step 310, PMIP gateway 116 may store a translation rule containing an association between the home IP address and the roaming IP address. Preferably, this translation rule instructs PMIP gateway 116 to translate the source address of packets that PMIP gateway 116 receives from WCD 112 from the home IP address to the roaming IP address. For packets that PMIP gateway 116 receives from a correspondent node, the translation rule may also instruct PMIP gateway 116 to translate the destination address from the roaming IP address to the home IP address.

To that point, FIG. 3B is a message flow 320 that illustrates such translations. At step 322, PMIP gateway 116 may receive data packet 1 from WCD 112. PMIP gateway 116 may examine the source IP address field of data packet 1 and determine that the source IP address is the home IP address, and therefore that the translation rule is to be applied to this packet. Thus, at step 324, PMIP gateway 116 may translate the source IP address in data packet 1 from the home IP address to the roaming IP address. At step 326, PMIP gateway 116 may transmit data packet 1 to correspondent node 126.

Conversely, at step 328, PMIP gateway 116 may receive data packet 2 from correspondent node 126. PMIP gateway 116 may examine the destination address field of data packet 2 and determine that the destination address is the roaming IP address, and therefore that the translation rule is to be applied to this packet. Thus, at step 330, PMIP gateway 116 may translate the destination address in data packet 2 from the roaming IP address to the home IP address. At step 332, PMIP gateway 116 may transmit data packet 2 to WCD 112.

It should be understood that a network address translation function, such as those described as part of steps 324 and 330, may include an application layer gateway arranged to allow traversal of application layer protocols such that transmits IP address and/or port data. Examples of the protocols include the Session Initiation Protocol (SIP) and the File Transfer Protocol (FTP).

FIG. 3C is a message flow 340 that continues the procedures illustrated in message flow 320. At step 342, PMIP gateway 116 switches from serving WCD 112 in simple IP with address translation mode to serving WCD 112 in PMIP mode. As discussed in Section III, there may be various reasons for PMIP gateway 116 doing so, including but not limited to WCD 112 nearing a geographic boundary of the wireless coverage of roaming network 110.

At step 344, PMIP gateway 116 may receive data packet 3 from WCD 112. Preferably, a source address of data packet 3 includes the home IP address. At step 346, PMIP gateway 116 may determine that WCD 112 is being served in PMIP mode, and then encapsulate data packet 3 and transmit it via a tunnel to home agent 138. Preferably, PMIP gateway 116 performs this step without translating the source IP address of data packet 3. After receiving encapsulated data packet 3, home agent 138 may de-encapsulate data packet 3, and at step 348, transmit data packet 3 to correspondent node 126.

At step 350, home agent 138 may receive data packet 4 from correspondent node 126. At step 352, home agent 138 may encapsulate data packet 4 and transmit it via a tunnel to PMIP gateway 116. In response to receiving tunneled data packet 4, PMIP gateway 116 may de-encapsulate data packet 4 and, at step 354, transmit data packet 4 to WCD 112.

b. Example Flow Charts

FIGS. 4A and 4B are flow charts providing example steps that may occur at a PMIP gateway in order to carry out functions akin to, or the same as, those illustrated in FIGS. 3A, 3B, and 3C. Flow chart 400 of FIG. 4A specifies steps that may be performed by a PMIP gateway that is arranged to serve WCDs via either a PMIP mode or a simple IP with address translation mode.

Accordingly, at step 402, the PMIP gateway may serve a given WCD with the simple IP with address translation mode. At step 404, the PMIP gateway may determine that the given WCD is likely to be handed off to a network that requires the PMIP mode or a mobile IP mode. At step 406, in response to determining that the given WCD is likely to be handed off to the network that requires the PMIP mode or the mobile IP mode, the PMIP gateway may change to serve the given WCD with the PMIP mode.

When serving the given WCD via the simple IP with address translation mode, the PMIP gateway may receive, from the given WCD, a first packet. The first packet may contain, as a source address, a home IP address that was assigned to the given WCD. The first packet may also contain a correspondent node IP address as a destination address. Preferably, the PMIP gateway had previously received the home IP address from the mobile IP home agent, and transmitted the home IP address to the given WCD for use by the given WCD. According to a translation rule accessible to the PMIP gateway, the PMIP gateway may translate the home IP address in the first packet to a roaming IP address, where the roaming IP address was also assigned to the given WCD. Then, the PMIP gateway may transmit the first packet to the correspondent node without PMIP encapsulation.

When serving the given WCD via the PMIP mode, the PMIP gateway may forward packets between the given WCD and a mobile IP home agent. Thus, after changing to serve the given WCD with the PMIP mode, the PMIP gateway may receive a second packet from the given WCD. Preferably, the second packet specifies the home IP address as a source address and the correspondent node IP address as a destination address. The PMIP gateway may transmit the second packet to the correspondent node via the home agent. The PMIP gateway transmission of the second packet may occur via a tunnel to the home agent, but without address translation.

Flow chart 420 of FIG. 4B also specifies steps that may be performed by a PMIP gateway that also is arranged to serve WCDs via either a PMIP mode or a simple IP with address translation mode. At step 422, the PMIP gateway may receive an address request message from a WCD. At step 424, in response to receiving the address request message, the PMIP gateway may conduct a PMIP transaction with the home agent to acquire a home IP address for the WCD. At step 426, in response to acquiring the home IP address, the PMIP gateway may transmit the home IP address to the WCD for use by the WCD. At step 428, the PMIP gateway may determine that the PMIP gateway is to translate between the home IP address and a roaming IP address for the WCD instead of performing PMIP services for the WCD (i.e., the PMIP gateway may select the use of simple IP with address translation mode instead of PMIP mode).

At step 430, in response to the determining that the PMIP gateway is to translate between the home IP address and a roaming IP address, PMIP gateway may store a translation rule. Preferably, the translation rule instructs the PMIP gateway to translate between the home IP address and the roaming IP address on behalf of the WCD. The translation rule may be stored at the PMIP gateway or at some other device accessible to the PMIP gateway.

The PMIP gateway may put the translation rule into effect as follows. When the PMIP gateway receives, from the WCD, a packet that specifies the home IP address as a source address and a correspondent node IP address as a destination address, the PMIP gateway may translate the source address in the packet to the roaming IP address. Then, the PMIP gateway may transmit the packet to the correspondent node without PMIP encapsulation. Conversely, when the PMIP gateway receives, from the correspondent node, a packet that specifies the roaming IP address as a destination address, the PMIP gateway may translate the destination address to the home IP address. Then, the PMIP gateway may transmit the packet to the WCD.

A PMIP gateway that performs the steps of flow chart 420 (or for that matter, any sequence of steps attributable to a PMIP gateway) may be part of a network architecture in which the PMIP gateway is operated by a first party and the home agent is operated by a second party. For instance, the first party may be an entity that operates and/or controls a roaming network, such as roaming network 110, and the second party may be an entity that operates and/or controls a home network, such as home network 130. Thus, the first party may provide the roaming wireless coverage area(s) that serve the WCD. Further, assignment of the home IP address to the WCD may be controlled by the second party, but assignment of the roaming IP address to the WCD may be controlled by the first party.

One way in which the PMIP gateway may determine to initially use simple IP with address translation mode for the WCD could involve the PMIP gateway determining that the WCD is not registered to use, or is unlikely to use, one or more services provided by the second party. In such an arrangement, there may be little or no need for the WCD's traffic to be routed via the home network. As a result, the PMIP gateway may initially apply simple IP with address translation mode to the WCD's traffic by default, instead of initially applying PMIP mode.

At one or more points in the duration of the PMIP gateway's serving the WCD, the PMIP gateway may switch the WCD's service from simple IP with address translation mode to PMIP mode. This switch may occur for various reasons. One such reason may be that the PMIP gateway determines that the WCD is nearing a geographic boundary of the wireless coverage provided by the first entity. Alternatively or additionally, the PMIP gateway may determine that the WCD is receiving a wireless signal below a threshold level from the wireless coverage area, thus indicating that the WCD may soon lose coverage from the wireless coverage area and potentially be handed off to the home network.

In response to making either of these determinations, the PMIP gateway may deactivate the translation rule. Deactivating the translation rule may involve, for example, deleting the translation rule, or leaving the translation rule undeleted but storing an indication that the translation rule is deactivated. Once the translation rule is deactivated, the WCD's service may be switched to PMIP mode. Preferably, this switch to PMIP mode occurs before the WCD is handed off to the wireless coverage provided by the second entity. Further, this switch may occur when the WCD is idle. (The PMIP gateway may determine that the WCD is idle if the PMIP gateway has not routed packets to or from the WCD for some period of time, or if a RAN component informs the PMIP gateway that the WCD is idle.)

V. Example Address Translation Rules

Figure 5:
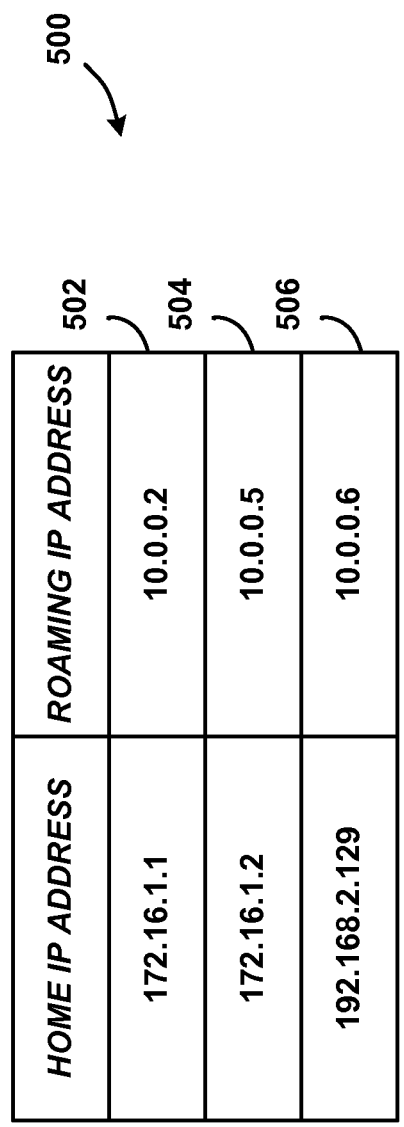
FIG. 5 depicts address translation rules, in accordance with an example embodiment.

FIG. 5 depicts table 500, illustrating example address translation rules, such as those referred to in FIGS. 3A, 3B, and 4B. Preferably, table 500 associates home IP addresses with roaming IP addresses. Thus, each entry of table 500 may include a home IP address allocated to a WCD by a home agent, and a roaming IP address allocated to the WCD by a PMIP gateway. Table 500 may be stored at, or accessible to, the PMIP gateway, and the PMIP gateway may refer to table 500 when translating source addresses or destination addresses of packets passing between the WCD and a correspondent node.

As illustrative examples of translation rules, table 500 includes entries 502, 504, and 506. Entry 502 associates home IP address 172.16.1.1 with roaming IP address 10.0.0.2. Thus, for instance, when the PMIP gateway receives a packet with a source address of 172.16.1.1 from a WCD, the PMIP gateway may translate the source address to 10.0.0.2. Similarly, entry 504 associates home IP address 172.16.1.2 with roaming IP address 10.0.0.5, and entry 506 associates home IP address 192.168.2.129 with roaming IP address 10.0.0.6.

It should be understood that table 500 could include additional information that has been omitted from FIG. 5 for purposes of presentation. For example, each entry of table 500 may include a WCD identifier of the WCD to which the translation rule applies, and/or the IP address of the home agent that assigned the home IP address to this WCD. Further, table 500 could contain more than three entries.

VI. Simple IP with Address Translation in a WCD

FIGS. 6A, 6B, 6C, 6D, 7A, 7B, and 7C are message flows and flow charts that illustrate additional embodiments through which a PMIP gateway, in conjunction with a WCD, can provide simple IP with address translation for the WCD, and then switch to providing PMIP services for the WCD. In these message flows and flow charts, the WCD may contain an application module and a translation module. Preferably, the application module binds to a local, or internal, IP address (e.g., an IP address that has significance only within the WCD, such as a loopback IP address or a private IP address). The translation module may then translate between this local IP address and either a home IP address or a roaming IP address assigned to the WCD. In this way, the address translation can be transparent to the application module, and the PMIP gateway need not support address translation.

Preferably, the application module is an application executing on the WCD. Thus, there may be multiple such application modules executing and communicating via the translation module at any one time. The translation module may also execute on the WCD, and may be integrated to some extent with a networking protocol stack of the WCD. Thus, the translation module may be able to translate IP addresses in packets transmitted by or transmitted to an application module without the application module being aware that the translation takes place. It is possible for a WCD to support multiple translation modules.

Regardless, the message flows and flow charts of FIGS. 6A, 6B, 6C, 6D, 7A, 7B, and 7C are not intended to be comprehensive, and have been simplified for purposes of presentation. Thus, each of these message flows and flow charts may include more or fewer steps than provided in these figures, and any one of these message flows and flow charts may be combined with any other without departing from the scope of the invention.

a. Example Message Flows

Figure 6A:
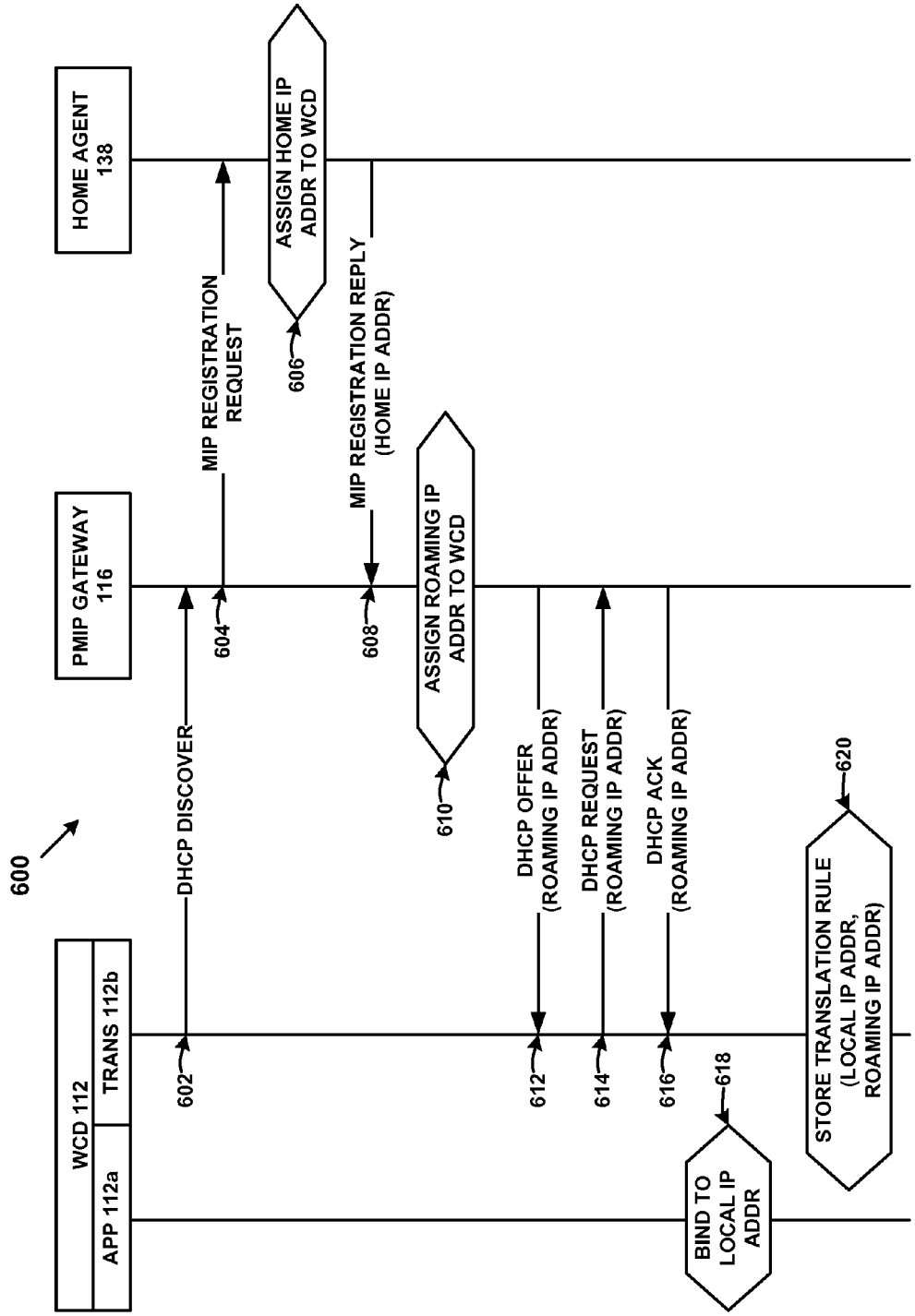
FIG. 6A is a fourth message flow diagram, in accordance with an example embodiment.

FIG. 6A is a message flow 600 in which a WCD 112 registers for PMIP service with a PMIP gateway 116, and PMIP gateway 116 determines to provide a simple IP service for WCD 112 instead. WCD 112 may comprise application module 112a and translation module 112b.

At step 602, translation module 112b of WCD 112 may transmit a DHCP DISCOVER message to PMIP gateway 116, requesting an IP address assignment. At step 604, in response to receiving the DHCP DISCOVER message, PMIP gateway 116 may transmit a mobile IP registration request to home agent 138 on behalf of WCD 112. At step 606, after receiving the mobile IP registration request, home agent 138 may assign a home IP address to WCD 112. At step 608, home agent 138 may transmit a mobile IP registration reply, containing the assigned home IP address, to PMIP gateway 116.

At step 610, PMIP gateway 116 may assign a roaming IP address to WCD 112. PMIP gateway 116 may determine to assign the roaming IP address to WCD 112 despite home agent 138 also assigning the home IP address to WCD 112. PMIP gateway 116 may do so by default (i.e., PMIP gateway 116 may exhibit this behavior for all WCDs it serves), or PMIP gateway 116 may do so selectively for WCD 112 (i.e., PMIP gateway may be configured so that WCD 112 is one of possibly many WCDs for which PMIP gateway 116 exhibits this behavior).

Regardless, at step 612, PMIP gateway 116 may transmit the roaming IP address to WCD 112 in a DHCP OFFER message. At step 614, translation module 112b may respond to the DHCP OFFER message with a DHCP REQUEST message, also containing the roaming IP address. At step 616, PMIP gateway 116 may respond to the DHCP REQUEST message by transmitting a DHCP ACK message, also containing the roaming IP address, to WCD 112. At this point, the DHCP transaction may complete, and translation module 112b may have learned that it was assigned the roaming IP address.

At step 618, which may take place at any point before step 620, application module 112a of WCD 112 may bind to (i.e., adopt for use) a local IP address. Application module 112a may then use the local IP address when communicating with other applications or modules within WCD 112. Application module 112a may also use the local IP address with communicating with other devices external to WCD 112, and may be unaware that translation module 112b could translate the local IP address into another IP address during these external communications.

As discussed above, the local IP address may be an address than is used internally within the WCD. As such, the WCD may select the local IP address from a predetermined range of local IP addresses, or via some other mechanism.

At step 620, translation module 112b may store a translation rule containing an association between the local IP address and the roaming IP address. The translation rule may be stored, for example, in an address translation rule table, such as table 500. Preferably, this translation rule instructs translation module 112b to translate the source address of packets that translation module 112b receives from application module 112a from the local IP address to the roaming IP address. The translation rule may also instruct translation module 112b to translate the destination address of packets that translation module 112b receives via PMIP gateway 116 from the roaming IP address to the local IP address.

To that point, FIG. 6B is a message flow 640 that illustrates such translations. At step 642, application module 112a may transmit data packet 5 to translation module 112b. Translation module 112b may then examine the source address field of data packet 5 and determine that the source address is the local IP address, and therefore that the translation rule is to be applied to this packet. Thus, at step 644, translation module 112b may translate the source address in data packet 5 from the local IP address to the roaming IP address. At step 646, translation module 112b may transmit data packet 5 to PMIP gateway 116, and at step 648, PMIP gateway 116 may transmit data packet 5 to correspondent node 126. Preferably, this transmission from PMIP gateway 116 to correspondent node 126 takes place without mobile IP encapsulation.

Further, at step 650, correspondent node 126 may transmit data packet 6 to PMIP gateway 116. Preferably, this transmission also takes place without mobile IP encapsulation. At step 652, PMIP gateway 116 may transmit data packet 6 to WCD 112, and data packet 6 may be received by translation module 112b. Translation module 112b may then examine the destination IP address field of data packet 6 and determine that the destination address is the roaming IP address, and therefore that the translation rule is to be applied to this packet. Thus, at step 654, translation module 112b may translate the destination IP address in data packet 6 from the roaming IP address to the local IP address. At step 656, translation module 112b may transmit data packet 6 to application module 112a.

It should be understood that a network address translation function, such as those described as part of steps 644 and 654, may include an application layer gateway arranged to allow traversal of application layer protocols such that transmits IP address and/or port data. Examples of the protocols include the Session Initiation Protocol (SIP) and the File Transfer Protocol (FTP).

FIG. 6C is a message flow 660 that continues the procedures illustrated in message flow 640. At step 662, PMIP gateway 116 may switch from serving WCD 112 in simple IP with address translation mode to serving WCD 112 in PMIP mode. As discussed in previously, there may be various reasons for PMIP gateway 116 doing so, including but not limited to WCD 112 nearing a geographic boundary of the wireless coverage of roaming network 110.

In order to switch to PMIP mode, PMIP gateway 116 may provide the home IP address to WCD 112. To do so, PMIP gateway 116 may perform a DHCP transaction with WCD 112. Thus, for example, at step 664, PMIP gateway 116 may transmit a DHCP FORCERENEW message to WCD 112. Preferably, this message triggers the recipient into renewing the recipient's DHCP-based IP address assignment. Thus, at step 666, translation module 112b may transmit a DHCP REQUEST message to PMIP gateway 116. Preferably, this DHCP REQUEST message contains the roaming IP address, which indicates that WCD 112 is requesting a renewal of its assignment of the roaming IP address. At step 668, PMIP gateway 116 may transmit a DHCP ACK message to WCD 112. Preferably, this DHCP ACK message contains the home IP address. Thus, in response to receiving a request for renewing the assignment of the roaming IP address to WCD 112, PMIP gateway 116 instead assigns the home IP address to WCD 112. Accordingly, at step 670, translation module 112b may store a translation rule containing an association between the local IP address and the home IP address.

Preferably, this translation rule instructs translation module 112b to translate the source address of packets that translation module 112b receives from application module 112a from the local IP address to the home IP address. The translation rule may also instruct translation module 112b to translate the destination address of packets that translation module 112b receives, via PMIP gateway 116, from the home IP address to the local IP address. This translation rule may replace the translation rule stored at step 620. Then, translation module 112b may use the home IP address when communicating via PMIP gateway 116.

Figure 6D:
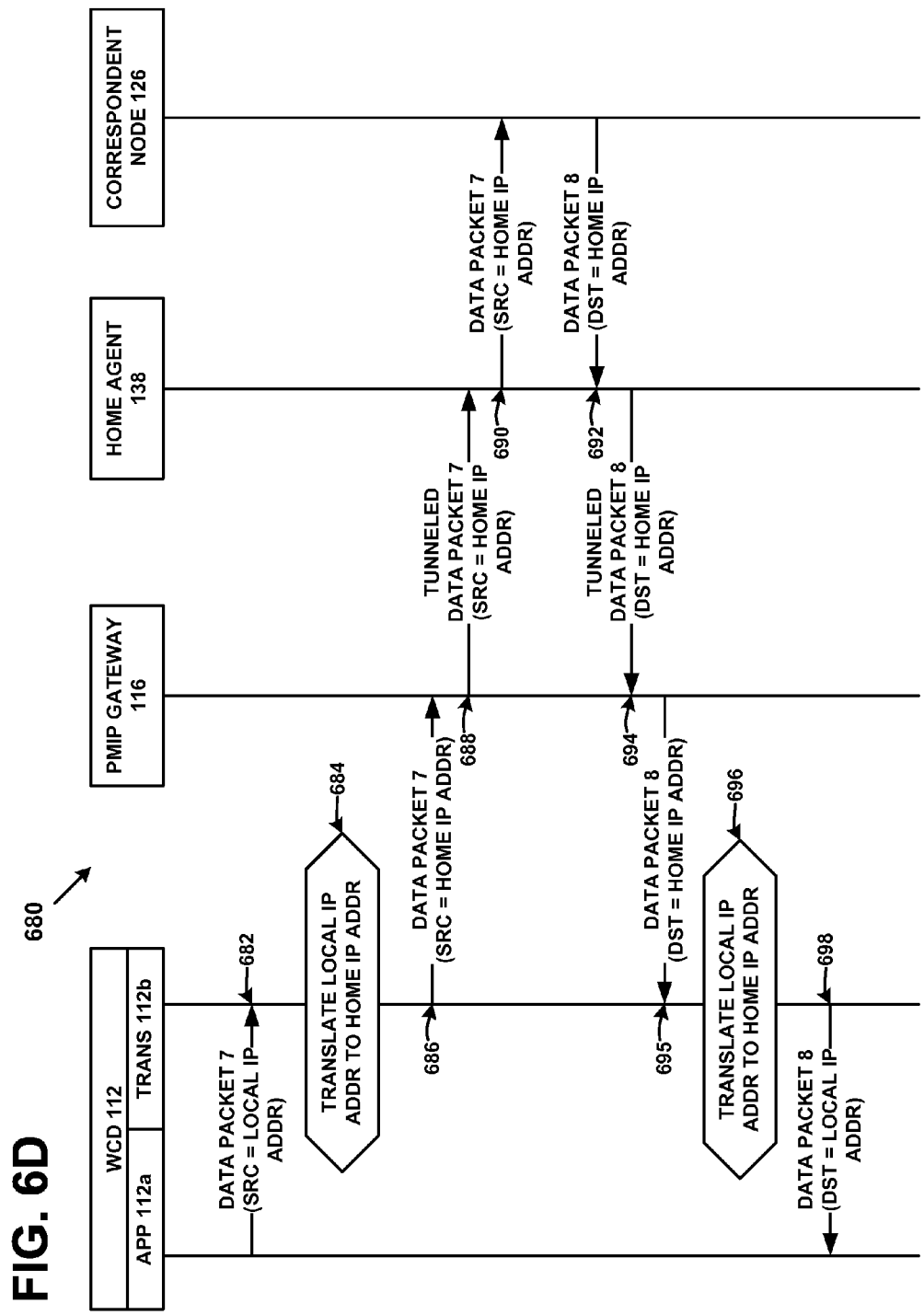
FIG. 6D is a seventh message flow diagram, in accordance with an example embodiment.

To that point, FIG. 6D is a message flow 680 that illustrates such translations. At step 682, application module 112a may transmit data packet 7 to translation module 112b. Translation module 112b may then examine the source IP address field of data packet 7 and determine that the source IP address is the local IP address, and therefore that the translation rule is to be applied to this packet. Thus, at step 684, translation module 112b may translate the source IP address in data packet 7 from the local IP address to the home IP address. At step 686, translation module 112b may transmit data packet 7 to PMIP gateway 116. After receiving data packet 7, PMIP gateway 116 may determine that WCD 112 is being served in PMIP mode. Therefore, at step 688, PMIP gateway 116 may encapsulate data packet 7 in a mobile IP tunnel, and transmit the encapsulated data packet 7 to home agent 138. At step 690, home agent 138 may de-encapsulate data packet 7 and transmit the de-encapsulated data packet 7 to correspondent node 126.

PMIP gateway 116 and WCD 112 may apply these procedures in a reverse fashion for packets originated by a correspondent node. For example, at step 692, correspondent node 126 may transmit data packet 8 to home agent 138. At step 694, home agent 138 may encapsulate data packet 8 in a mobile IP tunnel, and transmit the encapsulated data packet 8 to PMIP gateway 116. At step 695, PMIP gateway may de-encapsulate data packet 8 and transmit the de-encapsulated data packet 8 to WCD 112. Preferably, data packet 8 is received by translation module 112b. Translation module 112b may then examine a destination address field of data packet 8 and determine that this destination address is the home IP address, and therefore that the translation rule is to be applied to this packet. Thus, at step 696, translation module 112b may translate the destination IP address in data packet 8 from the home IP address to the local IP address. At step 698, translation module 112b may transmit data packet 8 to application module 112a.

Although FIGS. 6A and 6C depict translation module 112b performing DHCP transactions on behalf of WCD 112, this depiction is for sake of convenience. Thus, for example, WCD 112 could perform these DHCP translations with a different module (e.g., a DHCP client module) which then provides the assigned IP address to the translation module.

b. Example Flow Charts

Figure 7B:
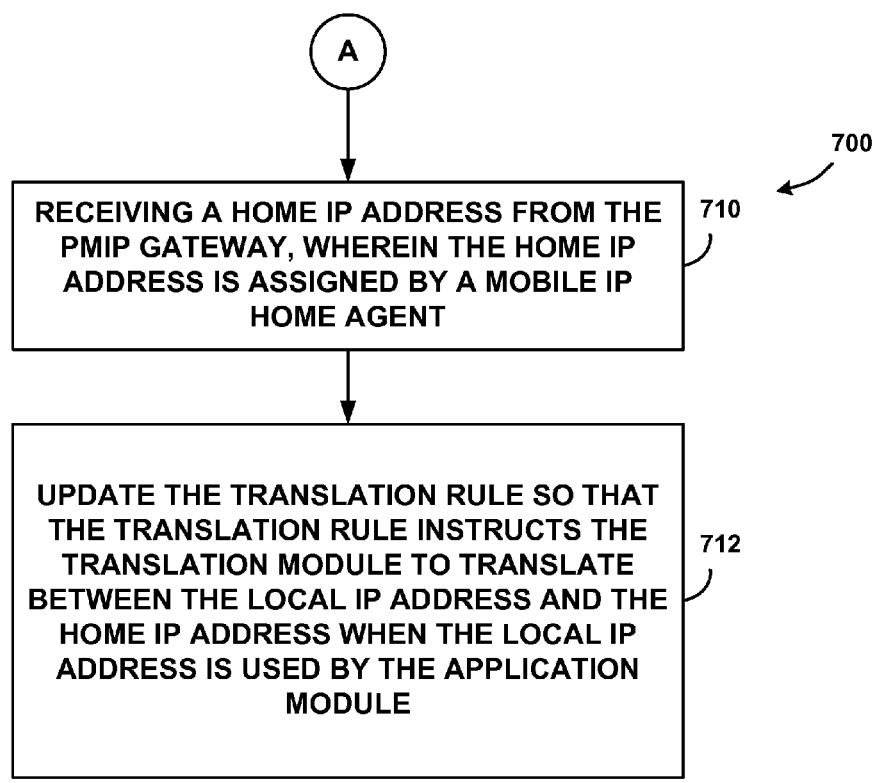
FIG. 7B is a fourth flow chart, in accordance with an example embodiment.

FIGS. 7A and 7B are flow charts providing example steps that may occur at a WCD in order to carry out functions akin to, or the same as, those illustrated in FIGS. 6A, 6B, 6C, and 6D. Similarly, FIG. 7C is a flow chart providing example steps that may occur at a PMIP gateway in order to carry out functions akin to, or the same as, those illustrated in FIGS. 6A, 6B, 6C, and 6D.

In FIG. 7A, a WCD contains an application module and translation module. Preferably, the application module is assigned a local IP address, and the WCD is operable to communicate with a proxy PMIP gateway. The application module may bind to the local IP address before or after the WCD receives a home or roaming IP address. The translation module may perform address translation.

At step 702, the WCD may receive, from the PMIP gateway, a roaming IP address to use when translating the local IP address. At step 704, in response to receiving the roaming IP address, the WCD may store a translation rule that instructs the translation module to translate between the local IP address and the roaming IP address when the local IP address is used by the application module. At step 706, the WCD may receive a renew message from the PMIP gateway. At step 708, in response to receiving the renew message, the WCD may transmit an address request message to a PMIP gateway.

Flow chart 700 continues on FIG. 7B. At step 710, preferably as a result of transmitting the address request message, the WCD may receive a home IP address from the PMIP gateway. The home IP address may have been assigned to the WCD by a mobile IP home agent. At step 712, in response to receiving the home IP address, the WCD may update the translation rule so that the translation rule instructs the translation module to translate between the local IP address and the home IP address when the local IP address is used by the application module.

The WCD may support DHCP for purposes of address management. Thus, the WCD may receive the roaming IP address as part of a first DHCP transaction with the PMIP gateway, and the WCD may receive the home IP address as part of a second DHCP transaction with the PMIP gateway. As an example, the WCD may receive these respective IP addresses in DHCP ACK messages. As another example, the renew message of step 706 may be a DHCP FORCERENEW message.

As discussed above, FIG. 7C is a flow chart 720 providing example steps that may occur at a PMIP gateway in order to carry out the embodiments herein. The PMIP gateway may provide network access service to a WCD. At step 722, the PMIP gateway may receive a first address request message from the WCD. At step 724, in response to receiving the first address request message, the PMIP gateway may assign a roaming IP address to the WCD, and provide a simple IP with address translation service for the WCD.

At step 726, the PMIP gateway may determine to provide a PMIP service for the WCD instead of the simple IP service, and at step 728, in response to determining to provide the PMIP service, the PMIP gateway may transmit a renew message to the WCD. At step 730, preferably as a result of transmitting the renew message, the PMIP gateway may receive a second address request message from the WCD. At step 732, in response to receiving the second address request message, the PMIP gateway may assign a home IP address to the WCD, and may provide the PMIP service for the WCD.

The PMIP gateway may support DHCP for purposes of address management. Thus, the PMIP gateway may transmit the roaming IP address to the WCD as part of a first DHCP transaction, and the PMIP gateway may transmit the home IP address as part of a second DHCP transaction with the PMIP gateway. As an example, the PMIP gateway may transmit these respective IP addresses in DHCP ACK messages. As another example, the renew message of step 728 may be a DHCP FORCERENEW message.

It should be understood that in any of the embodiments herein, a WCD may be assigned two or more IP addresses. Filters may be placed at the WCD and/or the PMIP gateway to control which IP address is used for various types of traffic. For instance, when address translation occurs in the WCD, the WCD may receive a simple IP address and a PMIP or mobile IP address. The WCD may determine to use the simple IP address for some types of traffic and the PMIP or mobile IP address for other types of traffic. Thus, in one case, the WCD may use the simple IP address for traffic for services on the roaming network, but the PMIP or mobile IP address for services on the home network. Alternatively or additionally, the WCD may use the simple IP address for certain types of applications (e.g., real-time applications use as voice over IP) and the PMIP or mobile IP address for other types of applications (e.g., best-effort applications).

VII. Example Embodiment Of a PMIP Gateway and/or a WCD

Figure 8:
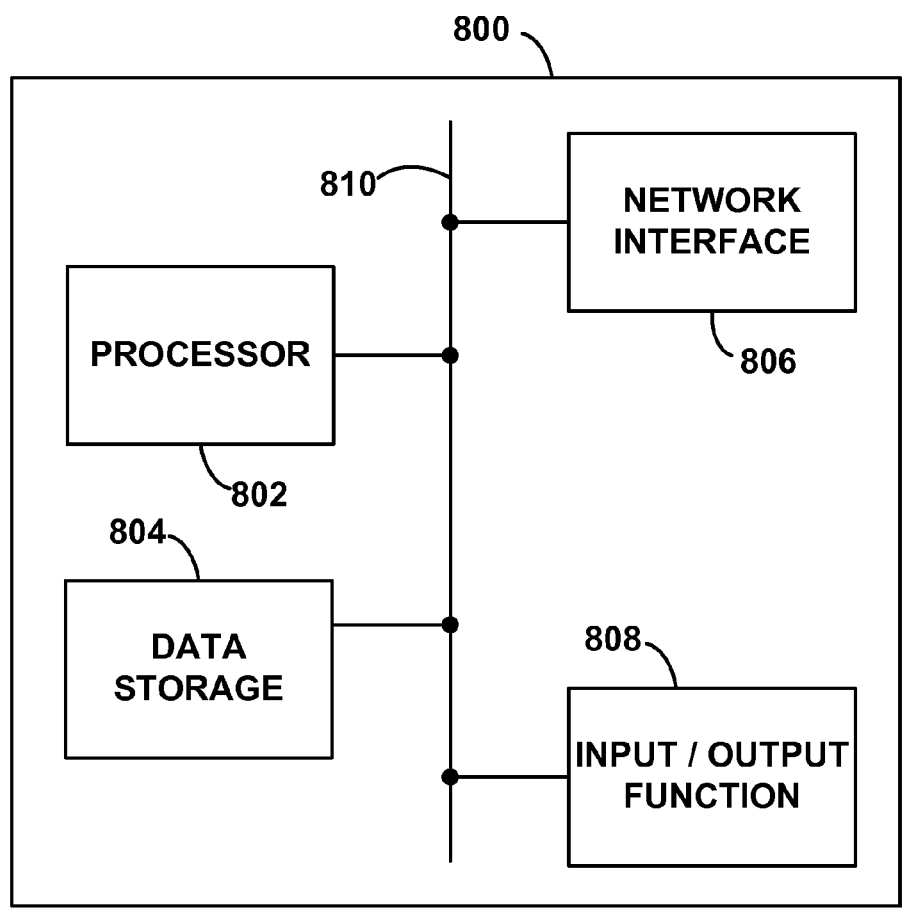
FIG. 8 is a simplified block diagram of a computing device representing a PMIP gateway or a WCD, in accordance with an example embodiment.

FIG. 8 is a simplified block diagram of an example computing device 800 that represents a PMIP gateway, such as PMIP gateway 116, and/or a WCD, such as WCD 112. FIG. 8 illustrates some of the functional components that would likely be found in either or both of these components, or any other component arranged to operate in accordance with the embodiments herein.

Example computing device 800 preferably includes a processor 802, a data storage 804, a network interface 806, and an input/output function 808, all of which may be coupled by a system bus 810 or a similar mechanism. Processor 802 preferably includes one or more CPUs, such as one or more general purpose processors and/or one or more dedicated processors (e.g., application specific integrated circuits (ASICs), network processors, or digital signal processors (DSPs), etc.)

Data storage 804, in turn, may comprise volatile and/or non-volatile memory and can be integrated in whole or in part with processor 802. Data storage 804 preferably holds program instructions, executable by processor 802, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 804 may contain program instructions executable by processor 802 to carry out any of the methods, processes, or functions disclosed in this specification or the accompanying drawings.

Network interface 806 may take the form of a wireline connection, such as an Ethernet, Token Ring, or T-carrier connection. Network interface 806 may also take the form of a wireless connection, such as CDMA, WIMAX®, UMTS®, LTE®, IDEN®, or 802.11. Thus, for example, when exemplifying a WCD, network interface 806 of example computing device 800 may be a CDMA interface, but when exemplifying a PMIP gateway, network interface 806 of example computing device 800 may be an Ethernet interface. However, other forms of physical layer connections and other types of standard or proprietary communication protocols may be used over network interface 806. Furthermore, network interface 806 may comprise multiple physical interfaces.

Input/output function 808 may facilitate user interaction with example computing device 800. Input/output function 808 may comprise multiple types of input devices, such as a keyboard, a mouse, a touch screen, and so on. Similarly, input/output function 808 may comprise multiple types of output devices, such as a monitor, printer, or one or more light emitting diodes (LEDs). Additionally or alternatively, example computing device 800 may support remote access from another device, via network interface 806 or via another interface (not shown), such an RS-232 or USB port.

VIII. Conclusion

Example embodiments have been described above. Those skilled in the art will understand, however, that changes and modifications may be made to these embodiments without departing from the true scope and spirit of the invention, which is defined by the claims.

What is claimed is:

1. A method performed at a wireless communication device (WCD), wherein the WCD contains (i) a translation module, and (ii) an application module that is assigned a local Internet Protocol (IP) address, the method comprising:
   the WCD receiving, from a proxy mobile IP (PMIP) gateway, a roaming IP address;
   in response to receiving the roaming IP address, the WCD storing a translation rule, wherein the translation rule instructs the translation module to translate between the local IP address and the roaming IP address when the local IP address is used by the application module, wherein the translation module translating between the local IP address and the roaming IP address comprises the application module forwarding a first packet to the translation module, wherein the first packet contains the local IP address as a source address, the translation module translating the source address in the first packet to the roaming IP address, and the translation module transmitting the first packet to the PMIP gateway;
   the WCD receiving a renew message from the PMIP gateway;
   in response to receiving the renew message, the WCD transmitting an address request message to a PMIP gateway;
   the WCD receiving a home IP address from the PMIP gateway, wherein the home IP address is assigned by a mobile IP home agent; and
   in response to receiving the home IP address, the WCD updating the translation rule so that the translation rule instructs the translation module to translate between the local IP address and the home IP address when the local IP address is used by the application module.

2. The method of claim 1, wherein the WCD receives the roaming IP address as part of a first Dynamic Host Configuration Protocol (DHCP) transaction with the PMIP gateway, wherein the WCD receives the home IP address as part of a second DHCP transaction with the PMIP gateway, and wherein the renew message is a DHCP FORCERENEW message.

3. The method of claim 1, wherein the translation module translating between the local IP address and the roaming IP address further comprises:
   the translation module receiving a second packet from the PMIP gateway, wherein the second packet contains the roaming IP address as a destination address;
   the translation module translating the destination address in the second packet to the local IP address; and
   the translation module forwarding the second packet to the application module.

4. The method of claim 1, wherein the translation module translating between the local IP address and the home IP address comprises:
   the application module forwarding a third packet to the translation module, wherein the third packet contains the local IP address as a source address;
   the translation module translating the source address in the third packet to the home IP address; and
   the translation module transmitting the third packet to the PMIP gateway.

5. The method of claim 4, wherein the translation module translating between the local IP address and the home IP address further comprises:

the translation module receiving a fourth packet from the PMIP gateway, wherein the fourth packet contains the home IP address as a destination address;

the translation module translating the destination address in the fourth packet to the local IP address; and the translation module forwarding the fourth packet to the application module.

6. The method of claim 1, wherein the application module binds to the local IP address before the translation module receives the roaming IP address.

7. The method of claim 1, wherein the application module binds to the local IP address after the translation module receives the roaming IP address.

8. A method comprising:

a proxy mobile Internet protocol (PMIP) gateway receiving a first address request message from a wireless communication device (WCD);

in response to receiving the first address request message, the PMIP gateway (i) assigning a roaming IP address to the WCD, and (ii) providing a simple IP service for the WCD;

while providing the simple IP service for the WCD, the PMIP gateway determining that the WCD is nearing a geographic boundary of the wireless coverage area;

based on the WCD nearing the geographic boundary of the wireless coverage area, the PMIP gateway determining to provide a PMIP service for the WCD instead of the simple IP service;

in response to determining to provide the PMIP service, the PMIP gateway transmitting a renew message to the WCD;

the PMIP gateway receiving a second address request message from the WCD, wherein the WCD generated the second address request message in response to receiving the renew message; and in response to receiving the second address request message and determining to provide the PMIP service for the WCD instead of the simple IP service, the PMIP gateway (i) assigning a home IP address to the WCD, and (ii) switching from providing the simple IP service for the WCD to providing the PMIP service for the WCD.

9. The method of claim 8, wherein determining that the WCD is nearing the geographic boundary of the first wireless coverage area comprises:

the PMIP gateway receiving geographic coordinates of the WCD; and the PMIP gateway determining that the geographic coordinates of the WCD are within a given range of the geographic boundary of the first wireless coverage area.

10. The method of claim 8, wherein the WCD is served by a wireless coverage area, and wherein determining to providing the PMIP service comprises:

the PMIP gateway determining that the WCD is receiving a wireless signal from the wireless coverage area below a threshold level.

11. The method of claim 8, wherein the assignment of the home IP address and the assignment of the roaming IP address are controlled by different parties.

12. The method of claim 8, wherein the first address request message and the second address request message are both Dynamic Host Configuration Protocol (DHCP) messages, and wherein the renew message is a DHCP FORCERENEW message.

13. A wireless communication device (WCD) comprising:

a processor;

a data storage;

an application module that is assigned a local Internet Protocol (IP) address;

a translation module; and program instructions, stored in the data storage and executable by the processor, for the translation module to (i) receive, from a proxy mobile IP (PMIP) gateway, a roaming IP address with which to use in translating the local IP address, (ii) in response to receiving the roaming IP address, store a translation rule, wherein the translation rule instructs the translation module to translate between the local IP address and the roaming IP address when the local IP address is used by the application module, and wherein the translation module translating between the local IP address and the roaming IP address comprises the application module forwarding a first packet to the translation module, wherein the first packet contains the local IP address as a source address, the translation module translating the source address in the first packet to the roaming IP address and the translation module transmitting the first packet to the PMIP gateway, (iii) receive a renew message from the PMIP gateway, (iv) in response to receiving the renew message, transmit an address request message to a PMIP gateway, (v) receive a home IP address from the PMIP gateway, wherein the home IP address is assigned by a mobile IP home agent, and (vi) in response to receiving the home IP address, update the translation rule so that the translation rule instructs the translation module to translate between the local IP address and the home IP address when the local IP address is used by the application module.

14. The WCD of claim 13, wherein the WCD receives the roaming IP address as part of a first Dynamic Host Configuration Protocol (DHCP) transaction with the PMIP gateway, wherein the WCD receives the home IP address as part of a second DHCP transaction with the PMIP gateway, and wherein the renew message is a DHCP FORCERENEW message.

15. The WCD of claim 13, wherein the program instructions for the translation module to translate between the local IP address and the home IP address comprises:

program instructions for the translation module to (i) receive a second packet from the application module, wherein the second packet contains the local IP address as a source address, (ii) translate the source address in the second packet to the home IP address, and (iii) transmit the second packet to the PMIP gateway.

16. The WCD of claim 13, wherein the application module binds to the local IP address before the translation module receives the roaming IP address.

17. The WCD of claim 13, wherein the application module binds to the local IP address after the translation module receives the roaming IP address.

* * * * *